United States Patent

[11] 3,573,750

[72] Inventor Takashi Ishidate
Tokyo, Japan

[21] Appl. No. 812,067
[22] Filed Apr. 1, 1969
[45] Patented Apr. 6, 1971
[73] Assignee Nippon Electric Company, Limited
Tokyo, Japan
[32] Priority Mar. 29, 1968, Mar. 29, 1968
[33] Japan
[31] 43/20914 and 43/20913

[54] HIGH-SPEED MEMORY SYSTEM
18 Claims, 10 Drawing Figs.

[52] U.S. Cl. .......... 340/172.5
[51] Int. Cl. .......... G06f 13/00, G11c 5/02, G11c 7/00
[50] Field of Search .......... 340/172.5; 235/157

[56] References Cited

UNITED STATES PATENTS 3,217,298 11/1965 Kilburn et al. .......... 340/172.5
3,394,353 7/1968 Bloom et al. .......... 340/172.5
RE26,624 7/1969 Bloom et al. .......... 340/172.5

*Primary Examiner*—Gareth D. Shaw
*Attorney*—Marn & Jangarathis

ABSTRACT: High-speed memory apparatus for use in a data processing system is provided in accordance with the present invention wherein the access experience of the information stored therein may be monitored and the address of the information having the least access experience determined so that new information may be substituted therefor. According to one embodiment of this invention, the high-speed memory apparatus includes a word-organized storage array having at least one monitoring storage element associated with each word therein. Each such monitoring storage element is coupled to means for rendering the magnetic state of said at least one monitoring storage element representative of the access experience of the word associated therewith. Additionally, means are provided for sensing the magnetic condition of each such monitoring storage element. Accordingly, the address of the word having the least access experience may be determined and new word information substituted therefor in the storage array.

INVENTOR.
Takashi Ishidate
BY
Marn & Jangarathis
ATTORNEYS

INVENTOR.
Takashi Ishidate
Marn & Jangarathis
ATTORNEYS

INVENTOR.
Takashi Ishidate
BY
Marn & Jangarathis
ATTORNEYS

INVENTOR.
Takashi Ishidate
BY
Mann & Jangarathis
ATTORNEYS

INVENTOR.
Takashi Ishidate
BY
Mann & Jangarathis
ATTORNEYS

HIGH-SPEED MEMORY SYSTEM

This invention relates to data processing systems and more particularly to high-speed memory apparatus therefor wherein select portions of the information stored in such high-speed memory apparatus may be monitored, the access experience of such information detected, and the desirability of maintaining said information in said high-speed memory apparatus determined.

Ideally, the memory apparatus included in the central processing unit of a data processing system should manifest high-speed and large storage capacity while being relatively inexpensive to manufacture and maintain. However, as random access, high-speed memories such as magnetic core, thin film, magnetic wire or multiapertured arrays are so expensive as to render the cost per bit excessive while high density, low cost per bit storage media such as magnetic discs, tapes and drums exhibit an access time which is generally too great; no such ideal memory apparatus is presently available for use within the central processing unit of data processing systems. Accordingly, recently developed computers have tended to employ a compromise design technique known as a hierarchy system wherein high-speed memory apparatus having a relatively low capacity is relied upon in combination with low-speed memory apparatus having a relatively large capacity.

In computers employing such a hierarchy system, information exhibiting the highest rates of readout recurrence, to wit, that information which is most frequently read out, is stored in high-speed, low capacity, memory apparatus while the remainder of the information storage available is relegated to high density, low-speed memory apparatus. However, since the readout recurrence rates of given information will vary from word to word with time, it is necessary in such computers that means be available to monitor the variations in such readout recurrence rates and to transfer information in response to the detection of a low readout recurrence rate from said high-speed memory apparatus to said low-speed memory apparatus or to an external memory and to substitute new information, supplied from said low-speed memory apparatus or an external source, therefor.

To accomplish this necessary mode of operation in such computers employing the hierarchy system, the page address form of high-speed memory apparatus has recently been proposed. According to one such proposal, as described in the paper entitled "Experience Using A Time-Shared Multiprogramming System With Dynamic Address Relocation Hardware," Proceedings Of The Spring Joint Computer Conference, 1967, pgs. 611—621; a data processing system comprising high-speed memory apparatus, low-speed memory apparatus, a control unit and an arithmetic unit is provided with registers to monitor the readout recurrence rate in the high-speed memory apparatus. More specifically, in the proposed data processing system, the high-speed memory apparatus includes a plurality of planar memory arrays each containing 256 words. A page number is then assigned to each of said planar memory arrays and if none of the 256 words stored therein are read out within a predetermined interval of time, all of the 256 words in the plane are transferred to the low-speed memory apparatus as if a page in a book was being closed out. This is accomplished by providing registers associated with each of said plurality of planar memory arrays and adapting said registers so that an output signal is available from a given register only when information stored in its associated memory array is read out. Thus, if none of the information stored in a planar memory array is read out, the corresponding register therefor will generate no output signal. The control unit is adapted to detect the state of the various registers and in response to a predetermined, detected condition transfer all of the information then stored in the associated memory array, to the low-speed memory apparatus or to an external memory so that new information may thereafter be written into this planar memory array. In the foregoing page address form of high-speed memory apparatus experience of access is monitored during a predetermined time interval for each planar memory array; however, no inquiry is made or can be made as to how long discrete portions of the entire body of information stored in the planar memory array has been present therein or how often such discrete portions have been read out therefrom. Thus as such planar memory arrays are usually word organized, information may be retained in a given memory array due to the high readout recurrence rate of a single word therein while the remaining words therein may have less access experience than other planar memory arrays which have been transferred. Therefore, as the critical determination as to what information is transferred would ideally be made on a word rather than an array basis, each of the planar memory arrays relied upon in a page address form of high-speed memory apparatus is not utilized as effectively as it otherwise might be. Furthermore, as the registers provided in the proposed page address form of high-speed memory apparatus are located external to the high-speed memory apparatus per se, the structure contemplated thereby is inherently disadvantageous as it tends to add to the overall complexity of the data processing system.

Accordingly, it is an object of the present invention to provide high-speed memory apparatus wherein the access experience of select portions of the information stored therein may be readily determined.

A further object of the present invention is to provide high-speed memory apparatus including at least one planar memory array wherein the access experience of any word stored therein may be readily determined.

An additional object of the present invention is to provide high-speed memory apparatus including at least one planar memory array wherein the time duration in which a word has been present therein is readily determinable.

Another object of the present invention is to provide high-speed memory apparatus including at least one planar memory array wherein the number of times a word stored therein has been read out is readily ascertainable.

While other objects of the present invention will become apparent from the detailed description of an illustrative embodiment thereof which follows, the novel features of the present invention will be particularly pointed out in connection with the claims appended hereto.

In accordance with an embodiment of this invention, a data processing system which includes high-speed memory apparatus, low-speed memory apparatus and control means adapted to transfer information at least therebetween is provided, said high-speed memory apparatus including at least one planar memory array wherein the monitoring of the access experience of words stored in said at least one planar memory array is accomplished by the monitoring of at least one storage element associated with each of said words, said at least one storage element being coupled to means for rendering the magnetic state of said at least one storage element representative of the access experience of the word associated therewith and means for sensing the magnetic state thereof, whereby the address of the word having the lowest access experience may be indicated to said control means and in response to such indication said control means may act to transfer said word out of said address and cause new information to be written thereinto.

The foregoing, as well as other objects of this invention, the features of this invention, and the present invention itself will be more clearly understood from the following description of an exemplary embodiment thereof when read together with the accompanying drawings in which.

Figure 2:
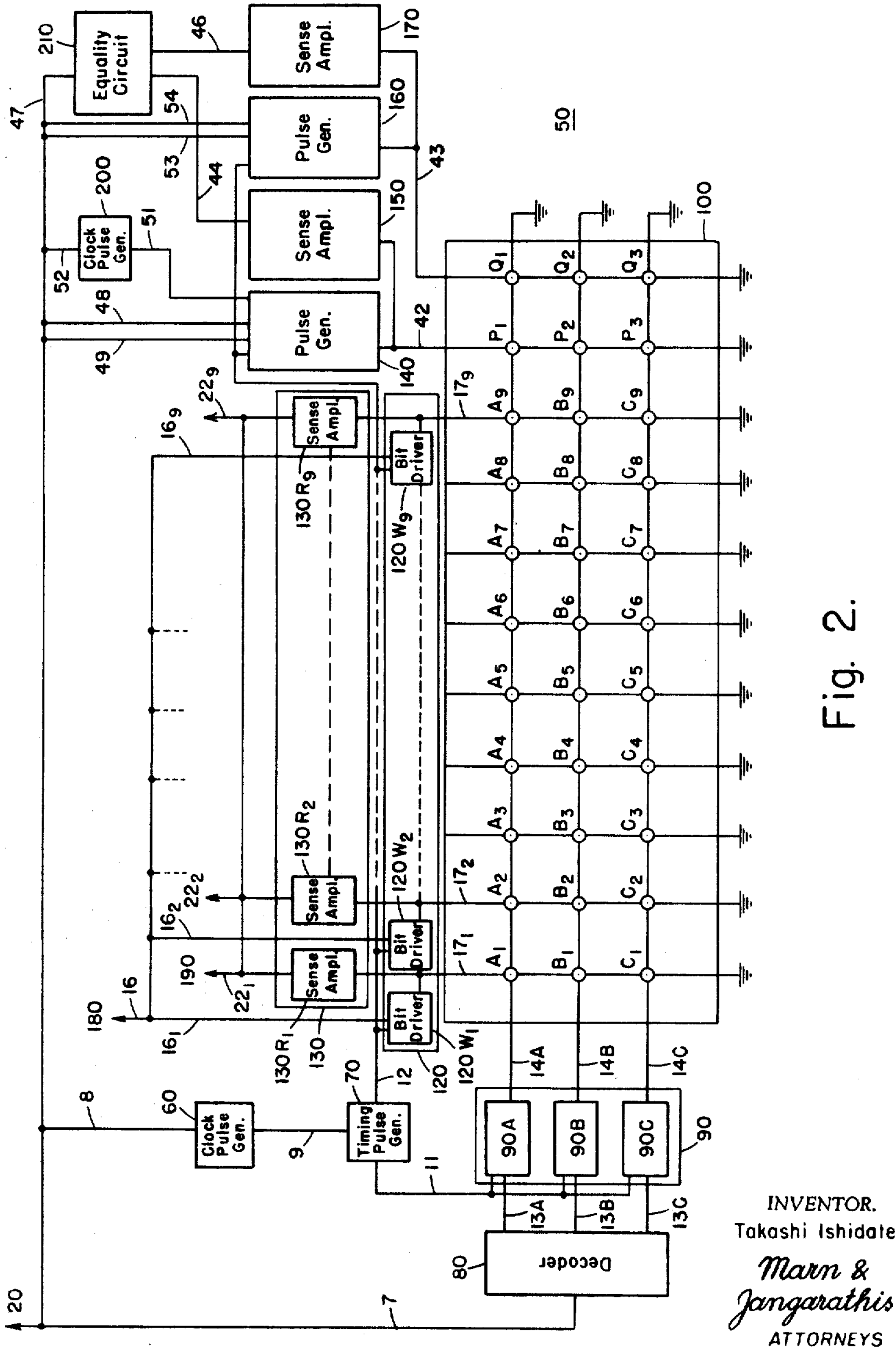
FIG. 2 is a schematic block diagram illustrating in detail an exemplary embodiment of the high-speed memory apparatus according to the present invention.
Figure 8:
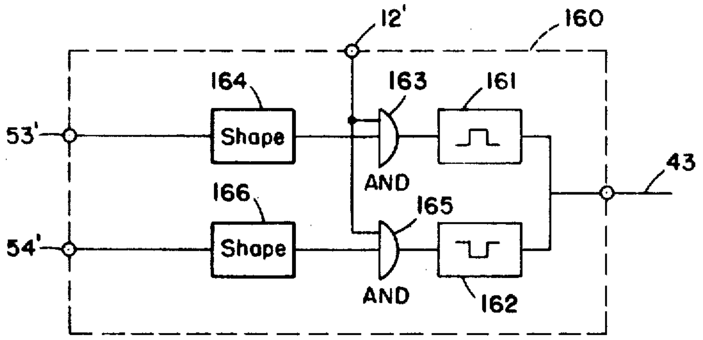
Figure 7:
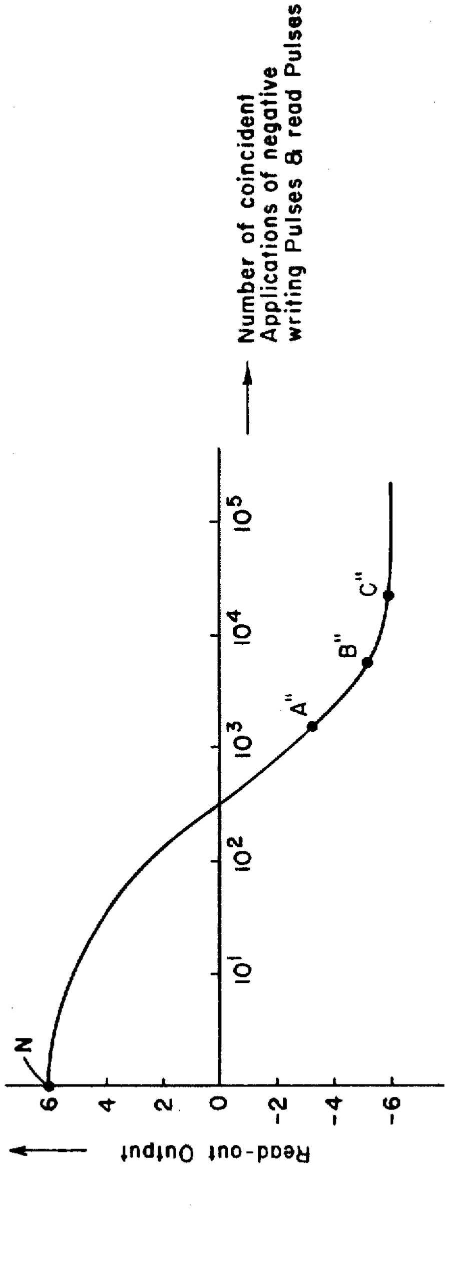

FIG. 7 is a graphical representation of the characteristics of memory elements associated with the second means for indicating the access experience of words stored in the embodiment of the high-speed memory apparatus according to the present invention; and FIG. 8 is a schematic block diagram illustrating an embodiment of second means for indicating the access experience of words stored in the embodiment of the high-speed memory apparatus illustrated in FIG. 2.

Figure 1:
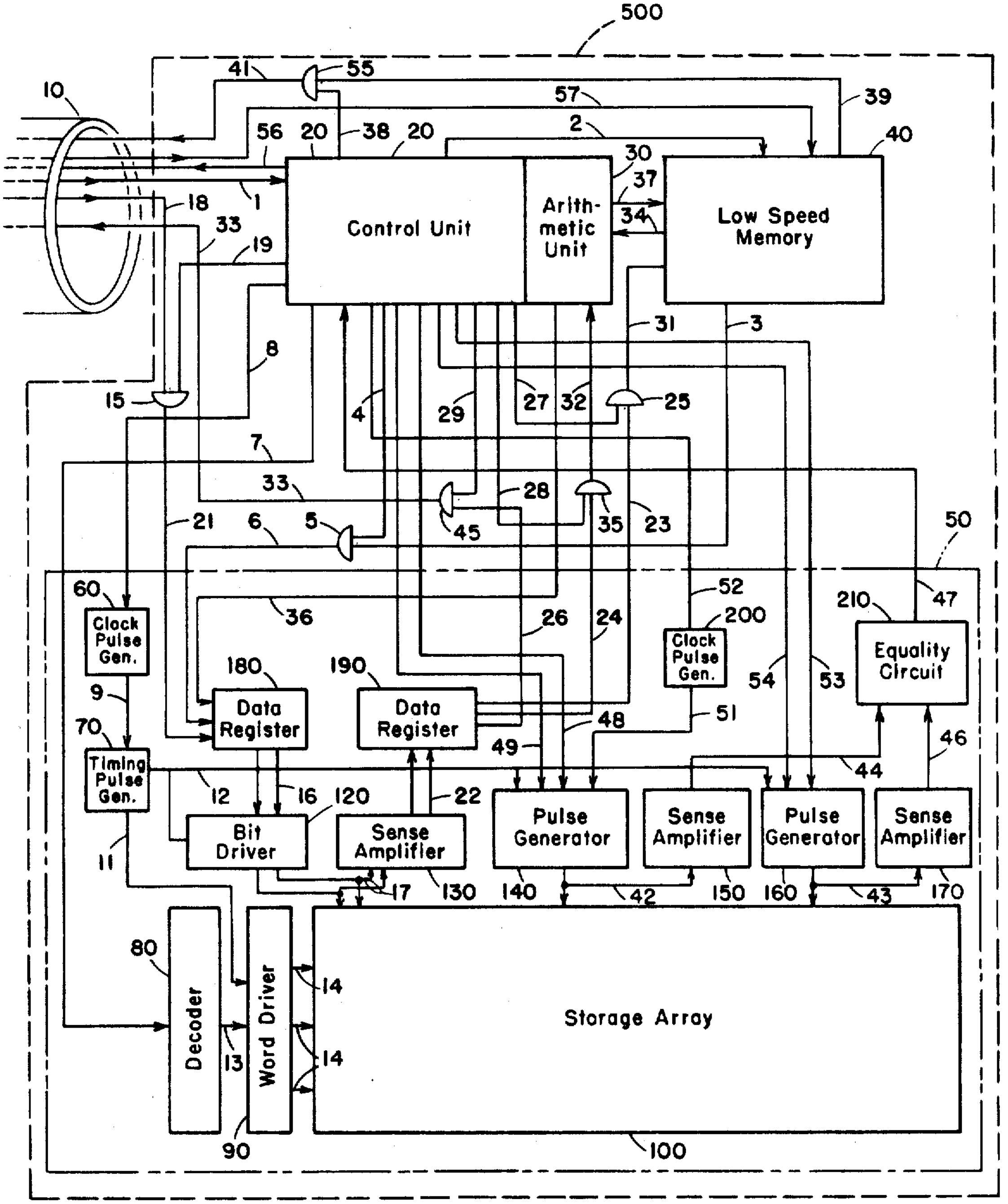
FIG. 1 is a schematic block diagram of a portion of a data processing system which illustrates the relationship between the high-speed memory apparatus according to the present invention and the pertinent units associated therewith.

Referring now to the drawings, and more particularly to FIG. 1 thereof, there is shown a schematic block diagram of a portion of a data processing system which illustrates the relationship between the high-speed memory apparatus according to the present invention and the pertinent units associated therewith. Accordingly, the apparatus depicted in FIG. 1 and enclosed within the dashed block 500 may be considered to be the central processing unit of an electronic data processing system which principally comprises a control unit 20, an arithmetic unit 30, low-speed memory apparatus 40 and an exemplary embodiment of the high-speed memory apparatus according to the present invention as indicated by the section line 50. The control unit 20 is, in the usual manner, adapted to respond to externally supplied instruction signals applied thereto via the cable 10 to control the storing, readout and transfer operations of the low-speed memory apparatus 40 and the high-speed memory apparatus 50. Therefore, as the various modes of operation of the central processing unit 500 will be specifically explained below, it is only necessary to here note that the control unit 20 is connected over a plurality of conductors to the low-speed memory apparatus 40 and the high-speed memory apparatus 50 so as to control the operation thereof while, in addition thereto, the control unit 20 is connected to a plurality of conductors present in the cable 10 which connects to external sources of instructions in the console and external memory apparatus. The low-speed memory apparatus 40 may comprise conventional, low cost, high density storage media such as magnetic drums, discs or tapes as well as the usual means for writing in or reading out designated information in response to control signals and information signals applied thereto from the control unit 20, the high-speed memory apparatus 50, and the external sources connected thereto over the cable 10. The low-speed memory apparatus 40 is designed to have a storage capacity substantially in excess of the high-speed memory apparatus 50 and is connected, in the manner indicated in FIG. 1, to a plurality of the conductors present in cable 10, to the arithmetic unit 30 over conductors 34 and 37, to the control unit 20 over conductor 2 and to the high-speed storage apparatus 50 over the conductors 3, 23 and 31. The high-speed memory apparatus 50, illustrated in FIG. 1, constitutes an exemplary embodiment of the present invention; however, as this exemplary embodiment of the present invention is explained in detail in conjunction with FIGS. 2—8, it is here sufficient to generally indicate the function of each of the components thereof and to note that in addition to the normal storing function which usually attaches to such high-speed memory apparatus, the high-speed memory apparatus according to the present invention is adapted so that each of the words stored therein may be monitored as to how long it has been present therein since it was transferred from an external memory, not shown herein, the low-speed memory apparatus 40, or the arithmetic unit 30 as well as how many times each of the words therein has been read out. Furthermore, the high-speed memory apparatus according to the present invention is also capable of indicating the address of the word which, due to the monitoring mentioned above, has the least experience of access and hence the least utility efficiency in the high-speed memory apparatus and provides signals representative of this address to the control unit 20 so that information transfer thereto may be achieved. The function of each of the components included in the high-speed memory apparatus as depicted in FIG. 1 will be described below. The high-speed memory apparatus illustrated in FIG. 1 is connected to conductors 18 and 33 of the cable 10, to the control unit 20 over a plurality of conductors whose function will be set out in detail hereinafter, to the arithmetic unit 30 over conductors 36, 24 and 32, and to the low-speed memory apparatus 40 over the conductors 3, 23, and 31. The arithmetic unit 30, may also be conventional, and is arranged so as to receive control signals from the control unit 20, to store information in the high-speed memory apparatus 50 and the low-speed memory apparatus 40. Thus the central processing unit 500 is connected through the cable 10 to external memory apparatus and to a console, not shown herein, and acts in response to instructions provided by the console to transfer information between the high-speed memory apparatus 50, the low-speed memory apparatus 40, as present therein, and said external memory apparatus. The external memory apparatus may have an access rate similar to that of the low-speed memory apparatus 40 and in cases where the capacity of the low-speed memory apparatus 40 is sufficiently large, no external memory apparatus is required. Since the detailed structure and operation of the control unit 20, the arithmetic unit 30 and the low-speed memory apparatus 40 are well known to those of ordinary skill in the art, their further explanation will be omitted in favor of simplifying the instant disclosure; and the description of the present invention as set forth below will be directed to these components only in so far as they are affected by or relate to the subject matter of the present invention.

The high-speed memory apparatus 50, as generally indicated in FIG. 1, comprises a planar storage array 100, word and bit driver means 90 and 120, information sense amplifier means 130, pulse generator means 140 and 160, and monitoring sense amplifier means 150 and 170. The planar storage array 100, as shall be seen more fully in conjunction with FIG. 2, comprises a word-organized array having a plurality of individual storage locations formed at the intersections of column and row conductors present therein. In addition, the planar storage array 100 is provided with specialized storage locations associated with each word therein so that the access experience of each word therein may be monitored and sensed. Furthermore, as the planar storage array 100 is word-organized, the operation thereof is according to a coincident current write, full current read technique so that the conductors utilized to apply bit write pulses to commonly located bit storage positions of the various words therein during a write operation are available for use as sense lines when selected words are read out. The word driver means 90 may take any of the conventional forms of such devices, as are well known to those of ordinary skill in the art, which act in the usual manner to supply pulses of the requisite polarity and magnitude to the conductors 14 associated with the respective word addresses located in the storage array 100. The word driver means 90 is connected over the line or lines 13 to the decoder means 80, which supplies pertinent word address information thereto so that said word driver means 90 will energize the conductor 14 associated with the selected word address in which the writing or readout operation is to take place. The decoder means 80 may be entirely conventional and is connected over conductor 7 to the control unit 20 which initially supplies the word address in encoded form thereto. In addition, the word driver means 90 is connected over conductor 11 to timing pulse generator means 70. The timing pulse generator means 70 is also a conventional device which acts in response to clock pulses applied thereto over conductor 9 to generate first and second timing pulses and apply such first and second timing pulses to the conductors 11 and 12, respectively. The first timing pulse as applied to the conductor 11 acts in the well-known manner to cause the word driver means 90 to pulse the selected word conductor 14 while the second timing pulse, applied to the conductor 12 a short time interval after the first timing pulse is applied to the conductor 11, acts to cause pulse production by the bit driver means 120, and the pulse generator means 140 and 160 connected thereto in a manner which is described hereinafter. The timing pulse generator means 70 is connected over conductor 9 to a clock pulse generator means 60 which acts in the conventional manner to supply clocking pulses thereto. The clock pulse generator means 60 is driven by the control unit 20 which is connected thereto by the conductor 8.

As the planar storage array 100 is word-organized and operates according to coincident current write, full current read techniques, each commonly positioned bit storage location in the planar word array 100 has a common conductor associated therewith. These conductors are indicated generally as 17 in FIG. 1 and are illustrated as being connected both to the bit driver means 120 and the information sense amplifier means 130. The bit driver means 120 may be conventional and acts in the well-known manner to apply write drive pulses of the requisite polarity and magnitude to the conductors 17 connected thereto so that desired information may be written in a selected word address due to the coincident application to each bit location thereof of bit drive pulses from the bit driver means 120 and word drive pulses from the word driver means 90. The bit driver means 120 is connected over lines 16 to data register means 180 and in addition thereto is connected over conductor 12 to the timing pulse generator means 70. The data register means 180 is conventional and acts in the well-known manner to supply the information to be written into a selected word by controlling the individual write pulses applied to the various conductors 17 by the bit driver means 120. The data register means 180 is connected over conductors 21 and 18 to external memory apparatus, not shown herein, over conductors 6 and 3 to the low-speed memory apparatus 40 and over conductor 36 to the arithmetic unit 30 so that each of the data sources thereby connected thereto may selectively supply information to be written into the storage array 100 under the control of the control unit 20. The second timing pulse applied, as aforesaid, to the bit driver means 120 over line 12 by the timing pulse generator means 70 acts to time the application of bit write pulses to the conductor 17 so that the necessary coincidence between bit write and word driver pulses may be achieved at each bit location in the desired word address being acted upon. The information sense amplifier means 130 may be conventional and may take the form of a plurality of individual amplifier means which are each connected to one of the conductors 17 so that upon the interrogation of a word by the word driver means 90, each bit therein will be read out in parallel on one of the conductors 17 and amplified by the portion of the information sense amplifier means 130 associated therewith. The output of the information sense amplifier means 130, which represents the information stored in each bit of the word read out, is supplied over the conductor 22 to the data register 190. The data register 190 may be conventional and acts inversely to the data register 180, in the well known manner, to receive the parallel bit information from the information sense amplifier means 130 and supply such information in the form of a serial pulse train to the apparatus designated by the control unit 20. The data register means 190 is connected at the output thereof to external memory apparatus, not shown herein, over conductors 26 and 33, to the arithmetic unit 30 over conductors 24 and 32, and to the low-speed memory apparatus 40 over conductors 23 and 31. The output of the data register 190 may be selectively connected to either the external memory apparatus, the arithmetic unit 30 or the low-speed memory apparatus 40 by the appropriate control of AND gates 45, 35 or 25, respectively, which are selectively enabled in the manner indicated by the control unit 20. Accordingly, it will be appreciated that information may be selectively obtained from or supplied to the external memory apparatus, not shown herein, the arithmetic unit 30 or the low-speed memory apparatus 40 and written into or read out from, respectively, the high-speed memory apparatus 50 under the direction of the control unit 20.

As shall be seen in more detail hereinafter, each word address present in the storage array 100 has associated therewith individual storage locations which are adapted to monitor the access experience of the word associated therewith. In the exemplary embodiment of the present invention specifically disclosed herein, the access experience of a word is monitored both as to how long it has been present in a designated word address and as to how often it has been nondestructively read out; however, as shall be obvious to those of ordinary skill in the art from the disclosure of the present invention, either of the above forms of monitoring the access experience of a given word may be utilized separately or as here, in combination, without any substantial deviations from the teachings herein. Accordingly, as two separate modes of monitoring the access experience of each of the words present in the storage array 100 are utilized in the instant embodiment of the subject invention, two commonly located storage locations are associated with each of the word addresses present in the storage array 100. Each of the commonly located storage locations utilized for monitoring access experience in the planar storage array 100 are linked by a common conductor 42 and 43. As shall be seen in conjunction with FIGS. 2—8, conductor 42 is coupled to storage locations indicative of how long a given word has been present in the associated word address, while the common conductor 43 links storage locations representative of the number of times the word associated therewith has been interrogated. The pulse generator means 140 and the sense amplifier means 150 are each connected to the conductor 42 and the pulse generator means 160 and the sense amplifiers 170 are each connected to the conductor 43. The precise structure and mode of operation of the pulse generator means 140 and 160 will be set forth in detail in conjunction with the description of FIGS. 3—8 below; therefore, it is sufficient at this point in the disclosure of the present invention to note that each of the pulse generator means 140 and 160 functions in response to timing pulses and control signals applied thereto to generate pulses which when applied to conductors 42 and 43, respectively, cause the storage locations magnetically coupled thereby to assume a magnetic condition representative of the condition of the word associated therewith to be monitored. As may be seen by inspection of FIG. 1, the pulse generator means 140 receives timing pulses over conductors 12 and 51 from the timing pulse generator means 70 and the clock pulse generator means 200, respectively, and control signals from the control unit 20 over conductors 48 and 49. Similarly, the pulse generator means 160 receives timing pulses over conductor 12 from the timing pulse generator means 70 and control signals from the control unit 20 through conductors 53 and 54. The clock pulse generator means 200 is conventional and may take the same form as the clock pulse generator means 60. The clock pulse generator means 200 is coupled to the control unit 20 through conductor 52 and accordingly the oscillations thereof are initiated by the control unit 20.

The sense amplifier means 150 and 170 are also coupled, as aforesaid, to the conductors 42 and 43. The operation of the sense amplifier means 150 and 170 will be explained in detail hereinafter; however, at this point in the disclosure of the present invention, it is merely necessary to note that the sense amplifier means 150 and 170 each receive pulses from the storage locations coupled by the conductors 42 and 43, respectively, indicative of the magnetic condition thereof.

Thereafter, each of the sense amplifier means 150 and 170 perform a comparison to determine which of the storage locations supplying pulses thereto have supplied pulses representing the least experience of access. Thus, the sense amplifier means 150 performs a comparison whose outcome is determinative of the word having the longest storage duration while the sense amplifier means 170 performs a comparison indicative of the word which has been read out the least number of times. The address of the word having the least experience of access as determined by the respective measures of each of the sense amplifier means 150 and 170 is applied to the equality circuit means 210 through conductors 44 and 46 respectively. The equality circuit means 210 may be conventional and acts in the well-known manner to compare the respective inputs applied thereto and when said inputs are equal provide an output signal representative thereof. Accordingly, as the equality circuit means 210 is in receipt of input signals representative of the word address having information stored therein whose experience of access is the least, as measured by each of the measures of the monitoring storage locations coupled to the conductors 42 and 43, when such signals are equal, the equality circuit means 210 applies a signal representative thereof to its output conductor 47. The output conductor 47 is coupled to the control unit 20 which thus receives signals indicative of the address of the words in the storage array 100 which have been stored the longest therein and read out nondestructively the lest number of times.

Although the foregoing description of the high-speed memory apparatus 50, as present in the central processing unit 500, has been directed to high-speed memory apparatus containing only a planar storage array 100, it should be appreciated that this embodiment has been adopted principally to simplify the explanation of the present invention by avoiding the multiplication of the structure illustrated in FIG. 1 which would be required if the storage array 100 were characterized as three dimensional. However, as shall be readily apparent to those of ordinary skill in the art, the storage array 100 in practical embodiments of this invention may readily be made three dimensional and the high-speed memory apparatus depicted in FIG. 1 could readily be modified to admit of operation therewith by appropriately duplicating the illustrated circuitry for each planar array thereof and providing the necessary additional logic circuitry therefor in the well-known manner.

As the central processing unit 500 illustrated in FIG. 1, by its very nature, admits of a wide range of differing functions, the operation thereof will be explained for each of the pertinent functions thereof as viewed from the standpoint of clearly understanding the operation of the embodiment of the high-speed memory apparatus according to the present invention as generally indicated in FIG. 1. Therefore, initially considering the mode of operation in which information presently stored in the low-speed memory apparatus 40 is to be transferred to an externally designated, predetermined address in the high-speed memory apparatus 50, it will be appreciated that instructional signals from the console, not shown herein, designating that a specified word stored in a given address of the low-speed memory apparatus 40 is to be transferred to an externally designated address in the high-speed memory apparatus 50, will be supplied to the control unit 20 through the signal line 1 present in the cable 10. In response to these instructional signals supplied over the signal line 1, the control unit 20 will apply control signals through the conductor 2, which control signals are operative in the well-known manner to cause the low-speed memory apparatus 40 to read out the information contained in the address designated by such control signals. In addition, the control unit 20 will apply gate-enabling signals to the AND gate means 5 through the conductor 4 so that the information read out of the low speed memory apparatus 40 may be transferred through the conductor 3, the AND gate means 5 and the conductor 6 to the data register means 180 of the high-speed memory apparatus 50. The data register 180 acts in response to the information applied thereto by the low-speed memory apparatus 40 to appropriately set each of the portions of the bit driver means 120 associated with the drive conductors 17 linking the address in the storage array 100 in which the transfer is to take place so that the proper 1 or 0 bit will be written therein when the coincident writing operation takes place, by the application to said bit driver means 120 of a plurality of data-representing signals over the conductors 16. The control unit 20 also applies address-designating signals through the conductor 7 to the decoder means 80 which acts in response thereto to supply an output signal to the word driver means 90 to enable the portion of the word driver means 90 associated with the word conductors 14 coupling the designated address. In addition, the control unit 20 applies a triggering signal to the clock pulse generator means 60 over the conductor 8 to initiate the oscillations therein. The output of the clock pulse generator means 60 is coupled to the input of the timing pulse generator means 70 through the conductor 9. The timing pulse generator means 70 in response to the clocking input signals applied thereto acts in the previously mentioned manner to generate a first timing pulse which is applied thereby to the conductor 11 and a short time interval thereafter a second timing pulse which is applied thereby to the conductor 12. The first timing pulse applied to the conductor 11 is coupled to the word driver means 90, as indicated in FIG. 1, and is operative to cause the portion of the word conductors 14 linking the designated word address, as enabled by the signals provided by the decoder means 80 over conductor 13, to provide a word pulse to the word conductors 14 linking the word address corresponding to that decoded by the decoder means 80 whereby one pulse of the coincident pair necessary to write a given bit of information is provided to each of the storage bit locations present in the designated word address. After a predetermined time interval has elapsed since the first timing signal was applied to the word driver means 90, the bit driver means 120 receives the second timing pulse supplied thereto over the conductor means 12 by the timing pulse generator means 70. In response to the receipt of the second timing pulse, the bit driver means 120 will act in the usual manner to apply properly directed write pulses, as determined by the signals applied thereto by the data register means 180, to the conductors 17 linking, respectively, each of the bits of the designated word address. Thus, the bit storage locations present in the designated word address receive second drive pulses respectively representative of the information read out from the low-speed memory apparatus and hence indicative of each bit to be written in the designated word address. Accordingly, as each bit storage location of the externally designated word address in the storage array 100 receives properly timed word drive and bit drive pulses representative of the bit to be written therein, the information read out of the externally designated address of the low-speed storage apparatus 40 is written into the designated address of the storage array 100 whereby the requisite transfer of information from the low-speed storage apparatus 40 to the high-speed storage apparatus 50 is accomplished.

Similarly, if it is now assumed that information from external memory apparatus, now shown herein, is to be transferred into the high-speed memory apparatus 50, the control unit 20 will receive through the conductor 1, present in the cable 10, an instruction signal indicating that specified information stored in memory apparatus external to the central processing unit 500 is to be transferred to an externally designated address in the storage array 100. In response to such instruction signal, the control unit 20 will supply an enabling signal to the AND gate means 15 through the conductor 19 so that the information read out from the external memory apparatus may be supplied to the data register means 180 through conductors 18 and 21. In addition, the control unit 20 will supply a trigger signal to the clock pulse generator means 60 over the conductor 8 and address-designating signals to the decoder means 80 so that the write in cycle for the readout information supplied to the data register means 180 may be accomplished in the precise manner indicated above for the previously described transfer operation from the low-speed memory apparatus 40 to the high-speed memory apparatus 50. Thus it will be seen that once instructional signals are provided to the control unit 20, the AND gate means 15 is enabled and information read out from the external memory apparatus is supplied to the conductor 18, the transfer of information present in said external memory apparatus to the high-speed memory apparatus 50 takes place in a similar manner to the transfer of information from the low-speed memory apparatus 40 to the high-speed memory apparatus 50.

If it is now assumed that inquiry is made at the console, not shown herein, as to which address in the storage array 100 of the high speed memory apparatus 50 has the least access experience or the lowest readout rate of recurrence and efficiency of use, instructional signals requesting that this information be supplied to the console will be applied to the control unit 20 through the conductor 1. As will be recalled from the discussion above, each of the word addresses present in the planar storage array 100 has storage locations associated therewith for indicating how long the word stored in each of the word addresses has been present therein and how often such word has been nondestructively read therefrom. Further, it will be recalled that the storage locations in the planar memory array 100, linked by the conductor 42, are relied upon for the former monitoring function, while the storage locations linked by the conductor 43 are utilized to accomplish the latter monitoring function. Although, the precise manner in which each of these monitoring functions is carried out will be described in more detail hereinafter, it should be here noted that when no readout cycle is initiated for the high-speed memory apparatus 50 after information has been written into the storage array 100 thereof, the pulse generator means 140, in a manner described below, applies periodic pulses to the conductor 42 adapted to change the magnetic condition of the monitoring storage element linked by such conductor 42, which as aforesaid serve to monitor the duration of a given word stored in the word address associated therewith. These periodic pulses, as shall be seen hereinafter, are adapted to discretely change the condition of the storage locations linked by the conductor 42 in a quantized manner such that the more of said pulses received by a given storage location, the more the magnetic condition thereof will be changed by the minor loop operation induced by said periodic pulses. In a similar manner, when words are read from the storage array 100 of the high-speed memory apparatus 50, the pulse generator means 160, in a manner to be fully described below, applies a unitary pulse to the conductor 43, adapted to act in combination with a read pulse to change the magnetic condition of the monitoring storage locations linked by the conductor 43 and associated with the word being read out. The monitoring storage locations coupled by the conductor 43, as aforesaid, serve to monitor the number of times that the words stored in the word addresses associated therewith have been read out. These unitary pulses, as shall be described below, are adapted to act in combination with the read pulses applied to a given word to discretely change the magnetic condition of the storage location coupled to the conductor 43, in the word address to be read, in a quantized manner such that the more of said unitary pulses received by a given storage location in the presence of a read pulse, the more the magnetic condition thereof will be changed by the minor loop operation caused by such unitary pulses and read pulses. Therefore, when the control unit 20 receives instructional signals from the console inquiring as to the address of the word stored in the storage array 100 whose access experience is the lowest, the monitoring storage locations associated with each of the word addresses present in the storage array 100 are in the magnetic condition caused by either the periodic pulses or the unitary pulses applied thereto by the pulse generator means 140 and 160, respectively, if any.

In response to the receipt of an instructional signal inquiring as to the address of the word having the lowest access experience, the control unit 20 will apply control signals to the conductors 7 and 8 which control signals act in combination to cause the word driver means 90 to successively and sequentially interrogate each of the words stored in the planar storage array 100 by the application of readout pulses to each of the word drive conductors 14 associated therewith. Accordingly, each of the monitoring storage locations associated with each of the word addresses present in the storage array 100 will be read out successively and sequentially by the readout pulses applied thereto and thus the magnetic condition of each of the monitoring storage locations will be successively and sequentially sensed by the conductor 42 or 43 coupled thereto. As a result, the readout pulses from each of the storage locations coupled to the conductor 42 will be successively and sequentially received by the sense amplifier means 150, while the readout pulses from each of the storage locations coupled to the conductor 43 will be received by the sense amplifier means 170. The sense amplifier means 150 and 170 each receive, amplify and compare the contents of the readout signals applied successively and sequentially thereto and each of said sense amplifier means supply, as a result of such comparison, the address of the word having the least access experience, as measured by the monitoring storage locations whose output signals are coupled thereto, to the equality circuit means 210. Thus, the sense amplifier means 150 supplies signals to the equality circuit means 210 through the conductor 44 representative of the address of the word having the longest storage duration in the storage array 100; while the sense amplifier means 170 applies to the equality circuit means 210, through the conductor 46, signals representative of the address of the word stored in the storage array 100 which has been read out the least number of times. The equality circuit 210, as previously mentioned, acts in the well-known manner to compare the address-representing signals applied to the respective inputs thereto by the sense amplifier means 150 and the sense amplifier means 170. Thus, when the outputs of the sense amplifier means 150 and 170 are the same, the equality circuit means 210 will produce an output on the conductor 47 representing the address of a word which has been stored the longest and has been read out the least number of times since it was written into the storage array 100. However, if the addresses represented by the outputs of the sense amplifier means 150 and 170 are not the same, no output will be produced at the output of the equality circuit means 210. The output of the equality circuit means 210, if any, is applied to the control unit 20 through the conductor 47. Upon the receipt of an output signal from the equality circuit means 210, the control unit 20 appropriately responds to the initial instructional signals applied thereto by coupling signals representative of the address of the word whose access experience is the least, as indicated by the output of the equality circuit means 210, to the externally provided console via the conductor 56 present in the cable 10. Therefore, when the control unit 20 receives an instructional signal inquiring as to the address of the word presently stored in the planar storage array 100 whose access experience is the least, the address of the word presently stored in the planar array 100 which has been stored therein the longest period of time and read out the least number of times is supplied by the control unit 20 to the console through the conductor 56.

After signals representative of the address of the word stored in the storage array 100, having the least access experience, have been supplied by the control unit 20 to the console over the conductor 56, it is usual for instructional signals to be supplied through conductor 1 to the control unit 20 requiring that the word having the least access experience be transferred from the indicated address in the high-speed memory apparatus 50 to an externally designated address in the low-speed memory apparatus 40. Upon receipt of this instructional signal through the conductor 1, the control unit 20 will transmit a control signal through the conductor 7 to the decoder means 80 representative of the address of the word whose access experience is the least. In addition, the control unit 20 supplies a trigger pulse through the conductor 8 to the clock pulse generator means 60 to initiate the oscillations thereof. The output of the clock generator means 60 is coupled to the timing pulse generator means 70 which acts in response to the clocking pulses applied thereto to generate, in the previously described manner, a first timing pulse on the conductor 11 coupled to one of the outputs thereof. As the conductor 11 is connected to the word driver means 90, the first timing pulse and the output of the decoder means 80 applied to the word driver means 90 through the conductor 13 act in combination, in the previously described manner, to cause the portion of the word driver means 90 associated with the word conductor 14, linking the externally designated word address, to apply a pulse to the associated word conductor 14 and hence interrogate each bit in the designated word. As each of the bits stored in the designated word address receives an interrogation pulse applied by the word driver means 90 to the appropriate word conductors 14 coupled to each bit in the designated word, each of the bits present therein is read out. The information contained in each bit of the designated word address is sensed by the parallel bit conductors 17 and thus the information present in the designated word address is amplified by the sense amplifier means 130 and applied thereby to the data register means 190 through the conductors 22 as a plurality of parallel information pulses. The word information thus applied in parallel to the data register means 190 is temporarily stored therein and is thereafter applied in the form of a serial pulse group to each of the output conductors 23, 24 and 26 connected thereto. The output of the data register means 190 is applied over the conductor 23 to one input of the AND gate means 25, over the conductor 24 to one input of the AND gate means 34 and over the conductor 26 to one input of the AND gate means 45. However, as the control means 20, in response to an instructional signal to transfer information to the low-speed memory apparatus 40, will only apply an enabling signal to the AND gate means 25, over the conductor 27, the output of the data register means 190 will only be applied, under these conditions, to the low-speed memory apparatus 40 through the conductor 23, the AND gate means 25 and the conductor 31. Upon receipt of the output of the data register means 190, the word information contained therein is stored in the low-speed memory apparatus 40 at an address therein specified by a control signal applied thereto by the control unit 20 over the conductor 2. Thus it is seen that upon the receipt of instructional signals requiring an externally designated word, which externally designated word may have the address of the word having the least access experience as previously supplied to the console, in the high-speed memory apparatus 50 to be transferred to an externally designated address of the low-speed memory address 40; the control unit 20 will act to cause the designated word address in the storage array 100 to be read out and the information contained therein to be applied to the designated word address of the low-speed memory apparatus 40.

Although the foregoing explanation of the transfer of word information from the high-speed memory apparatus 50 was concerned with a transfer of such word information to the low-speed memory apparatus 40, it will be appreciated that such transfer may be to external memory apparatus or to the arithmetic unit 30. In the former case, the readout of the externally designated word address in the storage array 100 would take place in the above-described manner but the output of the data register means 190 would be through the conductors 26 and 33 whereby the AND gate means 45 would be enabled by the control unit 20 over the conductor 29. Similarly, in the latter case, read out of the designated word address in the storage array 100 would occur as above but the output of the data register means 190 would be coupled to the arithmetic unit 30 through conductors 24 and 32 and the AND gate means 35 which would here be enabled by pulses applied thereto by the control unit via conductor 28. Additionally, it should be noticed that information may be read out of the low-speed storage apparatus 40 and applied to the arithmetic unit 30 through the conductor 34 while information present in the arithmetic unit 30 may be applied to the low-speed memory apparatus over conductor 37. Furthermore, information may be written into a designated word address in the planar storage array 100 from the arithmetic unit 30 in the same manner as was described above for the write-in operations from external memory apparatus or from the low-speed memory apparatus except when informational signals designating this write-in operation are supplied to the control means 20, the control means 20 will apply control signals to the arithmetic unit 30 to cause information to be transferred therefrom over conductor 6 to the data register means 180. In addition, information may be selectively transferred from the low-speed memory apparatus 40 to external memory apparatus through conductors 39 and 41 and the AND gate 55 which would be enabled over conductor 38 by the control unit 20 and from external memory apparatus to the low-speed memory apparatus 40 over the conductor 57 wherein the addresses utilized in the low-speed memory apparatus 40 would be controlled by the control unit 20 over conductor 2. Accordingly, it will be manifest that the embodiment of the high-speed memory apparatus 50 relied upon in the central processing unit 500, depicted in FIG. 1, allows maximum utility and efficiency to attach to the use of the planar storage array 100 as the access experience of the words stored therein is always available and hence only words whose information is in substantial demand may be maintained therein.

The embodiment of the high-speed memory apparatus according to the present invention, as generally illustrated and described in conjunction with FIG. 1, is illustrated in detail in FIG. 2. More particularly, FIG. 2 is a schematic block diagram illustrating in detail the pertinent portions of the exemplary embodiment of the present invention shown in FIG. 1. Accordingly, in FIG. 2, like reference numerals have been retained to identify previously described structure already set forth in FIG. 1; while the electrical connection of the various components illustrated in FIG. 2 to the components illustrated in FIG. 1, but omitted in FIG. 2, have been indicated by the use of arrow heads on the conductors to be further connected and reference numerals associated therewith to indicate the component to which such conductor is to be further connected.

As will be seen upon a comparison of FIGS. 1 and 2, the planar storage array 100, the word driver means 90, the bit driver means 120 and the information sense amplifier means 130 have been shown in more detail in FIG. 2, while the relationship between the pulse generator means 140 and 160, the sense amplifier means 150 and 170, and the planar storage array 100 have been made manifest. The planar storage array 100, as illustrated in FIG. 2, comprises a word-organized magnetic storage matrix which may be formed of a plurality of thin film storage elements arranged into columns and rows. The thin film storage elements may be provided on a planar substrate by vacuum disposition, sputtering or any other well-known technique and there is no requirement that individual thin film storage locations be relied upon. Thus, in the conventional manner, the planar storage array 100 may include a plurality of thin film storage elements arranged such that each row thereof A—C constitutes a word of the array while each storage bit 1—9 of each word A—C is commonly arranged as to column position. Furthermore, in the usual manner, each of the words A—C is magnetically coupled to a common word conductor 14A—14C, respectively, while each of the commonly positioned bits 1—9 in each word is magnetically coupled to a common conductor $17_1$—$17_9$, respectively. In addition, each of the word addresses formed in the storage array 100 has associated therewith first and second monitoring storage locations P and Q which may also take the form of thin film elements. Each of the first and second monitoring storage locations P and Q associated with a respective word is magnetically coupled to the word conductors 14 for that word, while each of the storage locations $P_1$—$P_3$ and $Q_1$—$Q_3$ are magnetically coupled to the column conductor 42 and 43, respectively, provided for the column in which they reside. Although the planar storage array 100 depicted in FIG. 2 has been illustrated as including only three words $A_1$—$A_9$, $P_1$ and $Q_1$; $B_1$—$B_9$, $P_2$ and $Q_2$; and $C_1$—$C_9$, $P_3$ and Q 3 so that the simplicity of the instant disclosure may be retained as will be readily apparent to those of ordinary skill in the art, in actuality, each planar array 100 utilized in the high-speed memory apparatus according to the present invention will comprise a much larger number of words.

As indicated in FIG. 2, the word driver means 90 is connected to each of the word drive conductors 14A—14C and is thus adapted to supply word write or interrogate pulses to each of the word addresses magnetically coupled to the word conductors 14A—14C. The word driver means, as illustrated in FIG. 2, may in the conventional manner comprise separate drive pulse portions 90A—90C such that a separate drive pulse portion 90A—90C is connected at its output to each of the word drive conductors 14A—14C, respectively. Thus, when encoded word address control signals are applied by the control unit 20 over the conductor 7 to the decoder means 80 in the manner described above in connection with FIG. 1, the decoder means 80 may act in the conventional manner to decode such address signals and in response thereto provide an enabling signal over one of the conductors 13A—13C associated with the portion 90A—90C of the word driver means 90 connected to the word conductor 14A—14C coupling the designated word address. When the timing pulse generator means 70 acting in response to the clock pulses applied thereto by the clock pulse generator means 60, in the manner described above, produces a first timing pulse on the conductor 11, only the portion 90A—90C of the word driver means 90 enabled by the decoder means 80 will respond to such first timing pulse, in the conventional manner, to produce a write or interrogate pulse on the word conductor 14A—14C connected thereto. As the planar memory array 100 illustrated in FIG. 2 is composed of thin film storage elements, the word driver means 90 need only produce pulses of a single polarity and magnitude regardless of whether a readout or write-in operation has been commanded, since in either case the pulses applied by the word driver means 90 need only rotate the magnetization vector of the thin film storage elements toward the hard axis; however, should other storage elements be utilized, each of the portions 90A—90C of the word driver means 90 could readily be modified to produce pulses of the opposite polarity for readout and for writing. Therefore, it will be seen that when one of the portions 90A—90C of the word driver means 90 applies a pulse to one of the word conductors 14A—14C, each of the memory storage elements $A_1$—$A_9$, $B_1$—$B_9$, or $C_1$—$C_9$ linked by such word conductor 14A, 14B or 14C as well as the monitoring storage elements $P_1$ $Q_1$, $P_2$ $Q_2$ or $P_3$ $Q_3$ associated therewith will receive such pulse as it traverses the word conductor to ground.

Each of the common conductors $17_1$—$17_9$ linking the commonly positioned bit storage elements in the same column in each word address of the memory array 100 is connected, as indicated in FIG. 2, to both the bit driver means 120 and the information sense amplifier means 130. As was indicated in the matter presented above with regard to FIG. 1, the bit driver means 120 may take any conventional form. Thus, in FIG. 2 the bit driver means 120 has been illustrated as comprising a plurality of separate bit driver portions $120W_1$—$120W_9$ which each connect at the output thereof to one of the common conductors $17_1$—$17_9$. In addition, each of the plurality of separate bit driver portions $120W_1$—$120W_9$ is connected at a first input thereto to one of the output conductors $16_1$—$16_9$, respectively, while each of said bit driver portions $120W_1$—$120W_9$ is commonly connected at a second input thereto to the second output of the timing pulse generator 70 over the conductor 12. Therefore, in operation during a write-in cycle, information to be stored in a designated word address in the storage array 100 will be supplied to the data register means 180 under the control of the control unit 20 in the manner aforesaid. The data register means 180 will apply each bit of the information to be stored, as supplied thereto, to one of the bit driver portions $120W_1$—$120W_9$ through the conductors $16_1$—$16_9$, respectively, so that each bit of information received by said data register means 180 is applied to the bit driver portions $120W_1$—$120W_9$ in the order in which it was received. The bit information thus applied to the bit driver portions $120W_1$—$120W_9$ acts in the well-known manner to set said bit driver portions $120W_1$—$120W_9$ so that upon the application of a timing pulse thereto, said bit driver portions $120W_1$—$120W_9$ will apply a pulse of proper polarity and magnitude to the common conductors $17_1$—$17_9$ to cause the magnetization vectors of the thin film storage elements linked thereto to tend to rotate in either the 0 or 1 direction depending upon the information to be written in that bit of the designated word. Furthermore, as the clock pulse generator means 60 is triggered by the control unit 20 and causes, in the manner specified above, the timing pulse generator means 70 to produce a second timing pulse on the conductor 12 connected to the second inputs of each of the bit driver portions $120W_1$—$120W_9$, the bit driver portions $120W_1$—$120W_9$, upon receipt of said second timing pulse, will apply a write pulse to the common conductors $17_1$—$17_9$, respectively, connected thereto which write pulse is representative of the bit to be written in the bit of the designated word address coupled to said conductor $17_1$—$17_9$. Thus, during a write-in cycle, the bit driver means 120 will supply pulses of proper polarity to each of the common conductors $17_1$—$17_9$ so that the bits of the word coupled thereto in receipt of these pulses as well as word drive pulses will have the information supplied to the data register 180 written thereinto.

The information sense amplifier means 130, as was previously stated above, may be conventional in form and has been illustrated in FIG. 2 as including a plurality of sense amplifier sections $130R_1$—$130R_9$ wherein the R added to the notation is indicative that the information sense amplifier means is only operative during a read operation while the subscripts 1—9 indicate the column bit position associated therewith. Each of the sense amplifier sections $130R_1$—$130R_9$ is connected at its input to one of the common conductors $17_1$—$17_9$ and is connected at the outputs thereof to the conductors $22_1$—$22_9$ respectively. The common conductors $17_1$—$17_9$, as aforesaid, each magnetically couple the commonly located storage bit positions of all of the word addresses present in the planar storage array 100 and hence each of the sense amplifier sections $130R_1$—$130R_9$ is coupled respectively to each storage column of the storage array 100 so that upon the interrogation of a given word, the pulses read out from each bit therein will be applied to one of the sense amplifier sections $130R_1$—$130R_9$. The conductors $22_1$—$22_9$ connected to the outputs of the sense amplifier sections $130R_1$—$130R_9$, respectively, are each coupled in parallel to the inputs to the data register means 190 which, as aforesaid, is adapted to receive parallel information signals applied thereto and further transfer such information signals to the low-speed memory apparatus 40, the arithmetic unit 30 or external memory apparatus under the control of the control unit 20. Therefore, with the information sense amplifier means 130 arrangement illustrate in FIG. 2, it will be seen that when a given word in the memory array 100 is interrogated by the application of a readout pulse to one of the word conductors 14A—14C, in the manner stated above, the temporary change in the magnetic state of each of the storage elements therein representing a storage bit will be separately induced in one of the common conductors $17_1$—$17_9$ and applied to the sense amplifier sections 130 $R_1$—130 $R_9$, respectively. Thereafter the thus read out bit information pulses will be amplified and applied to the data storage register 190 for further transmission within the data processing system in the manner stated above in regard to FIG. 1.

The monitoring thin film storage elements $P_1$—$P_3$ and $Q_1$—$Q_3$ are each arranged in the memory array 100, as indicated in FIG. 2, such that one monitoring storage element of each letter designation is present in each of the word addresses of the memory array 100. Thus, an inspection of FIG. 2 reveals that monitoring storage elements $P_1$ and $Q_1$ are present in the A word address coupled by the word conductor 14A, monitoring storage elements $P_2$ and $Q_2$ are present in the B word address coupled by the word conductor 14B and monitoring storage elements $P_3$ and $Q_3$ are present in the C word address coupled by the word conductor 14C. Furthermore, each of the monitoring storage elements $P_1$—$P_3$ and $Q_1$—$Q_3$ of the same letter designation maintain a common column position in each of the word addresses A—C whereby the monitoring storage elements $P_1$—$P_3$ are coupled by the common column conductor 42 and the monitoring storage elements $Q_1$—$Q_3$ are coupled by the common column conductor 43. As previously mentioned above, the monitoring storage elements $P_1$—$P_3$ and $Q_1$—$Q_3$ function in the high speed memory apparatus according to the present invention to monitor the experience of access of each of the words stored in the memory array 100. More particularly the monitoring storage elements $P_1$—$P_3$ indicate how long a word stored in the word addresses A—C, respectively, has been present therein, while the monitoring storage elements $Q_1$—$Q_3$ indicate how often a word stored in the word addresses A—C, respectively, has been read out. The common conductor 42 which couples each of the monitoring storage elements $P_1$—$P_3$ is connected, as previously indicated, to the pulse generator means 140 and the sense amplifier means 150. As was generally described above, the function of the pulse generator means 140 and the manner in which the function of the monitoring storage elements $P_1$—$P_3$ is carried out, is by the application of timing pulses and control signals to the pulse generator means 140 such that said pulse generator means 140 will cause the monitoring storage elements $P_1$—$P_3$ to assume a magnetic condition representative of the condition of the word associated therewith. The pulse generator means 140 was further stated to cause this condition to obtain by the application of periodic pulses to the conductor 42, after a write-in operation and in the absence of a readout operation, adapted to discretely change the condition of the monitoring storage elements $P_1$—$P_3$, in a quantized manner, such that the more of said periodic pulses received by a given monitoring storage element, the more the magnetic condition thereof will be changed by the minor loop operation induced by said periodic pulses. Thus, the longer a given word has been present in a given word address the more the magnetic condition of the monitoring storage element associated with that word will be changed. The relationship between the write pulses applied to a word conductor 14A—14C and the periodic pulses applied to the conductor 42 by the pulse generator means 140 is shown in FIGS. 3A and 3B wherein such write pulses are indicated in FIG. 3A, while the pulses applied to conductor 42 are illustrated in FIG. 3B.

Figure 3A:
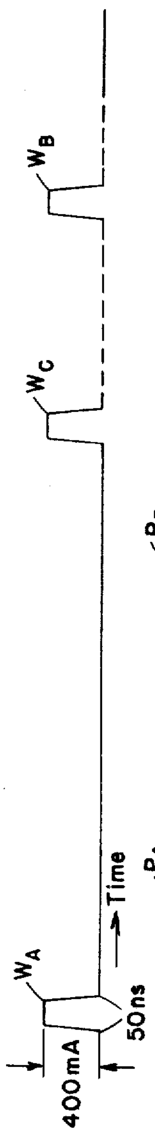
FIG. 3A and 3B are waveforms representative of the relationship between write pulses applied to store a word and the pulses applied by a first means for indicating the access experience of words stored in the embodiment of the high-speed memory apparatus illustrated in FIG. 2, respectively.
Figure 3B:

If FIGS. 3A and 3B are considered, the manner in which the monitoring storage elements $P_1$—$P_3$ are placed in a magnetic condition representative of how long the given word stored in the word addresses associated therewith has been stored therein may be rendered apparent. When a new word is written, for instance, in word address A, the word conductor 14A has the write pulse $W_A$, shown in FIG. 3A, applied thereto by the word driver portion 90A while each of the storage bits located in the A address, $A_1$—$A_9$, receive the requisite column pulses, not illustrated herein, over the common conductors $17_1-17_9$, respectively, in time coincidence with said write pulse $W_A$. In addition, each of the monitoring storage elements $P_1$—$P_3$ receive a negative pulse $P_N$, illustrated in FIG. 3B, supplied by the pulse generator means 140 over the column conductor 42. As the monitoring storage element $P_1$ is located at the intersection of the word conductor 14A and the column conductor 42, the monitoring storage element $P_1$ receives both of the pulses $W_A$ and $P_N$ shown in FIGS. 3A and 3B, respectively, which pulses are coincident or partially coincident in time. The monitoring storage elements $P_2$ and $P_3$, however, receive only the pulse $P_N$ as the word conductor 14A is not coupled thereto. Since the monitoring storage element $P_1$ is subject to the coincident application of the drive pulses $W_A$ and $P_N$, the monitoring storage element $P_1$ will, in the well-known manner, be switched to one of two possible saturated states and when such drive pulses $W_A$ and $P_N$ subside, the monitoring storage element $P_1$ will exhibit the remanent magnetic condition related to the state of saturation to which it was driven by said drive pulses $W_A$ and $P_N$. Thus, immediately after a write operation has been completed in the word address A, the monitoring storage element $P_1$ will be in one of its remanent states of magnetization, which may here be assumed to be the negative remanent state, while the monitoring storage elements $P_2$ and $P_3$ have not been so switched. If it is now assumed for the purposes of explanation, that no read operation or further write cycle takes place, the pulse generator means 140 applies periodic pulses to the conductor 42, in a manner to be described subsequently, of opposite polarity to the pulse $P_N$ applied thereby during the foregoing write operation. These pulses are illustrated as pulses $P_A$ in FIG. 3B and are shown therein as positive pulses having a 50 nsec. duration which are periodically applied once every 200 nsec. The monitoring storage elements $P_1$—$P_3$ are selected to have a hysteresis characteristic so that pulses such as pulses $P_A$, illustrated in FIG. 3B, will disturb the monitoring storage elements $P_1$—$P_3$ sufficiently to cause minor loop operation therein in a similar manner to a quantized pulser. Accordingly, each pulse $P_A$ applied to one of the monitoring storage elements $P_1$—$P_3$ will cause a minor loop excursion to take place therein so that for each periodic pulse received the magnetic condition of that monitoring storage element will be discretely changed whereby the magnetic condition thereof will change from an initial remanent state, as induced by pulses of opposite polarity to pulses $P_A$, toward the opposite remanent state in a series of discrete or quantized steps. If it is further assumed that after a sufficient time interval has elapsed for a substantial number of periodic pulses $P_A$, as illustrated in FIG. 3B, to be applied by the pulse generator means 140 to the conductor 42, a new word is written into the word address C, as indicated by pulses $W_C$ and $P_N'$ in FIGS. 3A and 3B, and after a further time interval has elapsed, a new word is written into the word address B, as indicated by the pulses $W_B$ and $P_N''$ in FIGS. 3A and 3B; it will be seen that the magnetized condition of monitoring element $P_1$ is the furthest away from the initial, negative remanent state, while the magnetized condition of monitoring element $P_3$ will reside intermediate the initial, negative remanent state and the magnetized condition of monitoring storage element $P_1$. Similarly, the magnetic condition of monitoring storage element $P_2$ is at the negative state. Therefore, as it is well known that the magnitude of the read out pulse received from an interrogated storage element is directly related to the magnetic condition of the storage element compared to the magnetic condition induced by the interrogating pulse, it will be seen that for the conditions illustrated in FIGS. 3A and 3B, when the monitoring storage elements $P_1$—$P_3$ are nondestructively read out in a direction to induce a rotation toward said negative remanent state, the storage elements $P_1$—$P_3$ will produce readout pulses whose magnitude in a given polarity are directly related to the number of periodic pulses which they have received. Thus, if it is assumed that at a certain time interval after the write-in sequence illustrated in FIGS. 3A and 3B has been completed, the monitoring storage elements $P_1$—$P_3$ are sequentially and nondestructively read out, the monitoring storage element $P_1$ will induce the largest pulse in conductor 42 indicating the word A has been stored the longest, the monitoring storage element $P_2$ will induce the smallest pulse in conductor 42 indicating the word has been stored the shortest period of time and the monitoring storage element $P_3$ will induce a pulse of intermediate magnitude in conductor 42 indicating the word C has been stored less time than the word in the A word address but more time than the word stored in the B word address.

Figure 4:
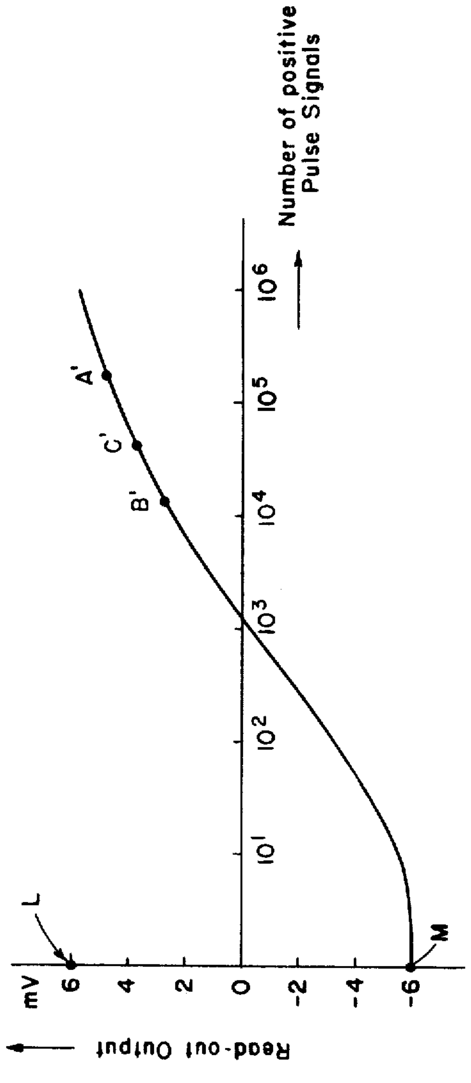
FIG. 4 is a graphical representation of the characteristics of certain memory elements illustrated in FIG. 2.

FIG. 4 is a graphical representation of the magnitude of a readout pulse produced by a monitoring storage element such as one of the monitoring storage elements $P_1$—$P_3$ plotted as a function of the number of periodic pulses $P_A$ applied thereto. In FIG. 4, the magnitude of such readout pulse is plotted in millivolts as the ordinate while the number of periodic pulses received is plotted along the abscissa. The point M indicated in FIG. 4 is representative of the condition of a monitoring storage element $P_1$—$P_3$ when no periodic pulses have been received thereby and hence is the condition immediately following a write-in operation when the core is in the negative remanent condition under the assumptions made above. The point L indicated in FIG. 4 is representative of a condition of a monitoring storage element wherein it has received so many periodic timing pulses that said monitoring storage element has reached the opposite remanent condition from that which initially obtained when the write-in operation has terminated. The points A', C', B' indicate the condition of the monitoring storage elements $P_1$, $P_3$ and $P_2$, respectively and hence the words stored in the word addresses A, C and B under a write-in sequence similar to that postulated above; however, as clearly indicated by the abscissa, the intervals which obtained between the various write-in operations was more substantial than that indicated in FIG. 3B.

As was mentioned above in conjunction with the description of FIG. 1, when the address of the word stored in the planar memory array 100 having the least experience of access is sought, interrogation pulses are sequentially applied to each of the word conductors 14A—14C present in the memory array 100. This operation insofar as the monitoring storage elements $P_1$—$P_3$ are concerned results in the sequential application to the conductor 42 of three pulses read out from the storage elements $P_1$—$P_3$, respectively. When these pulses are applied to the sense amplifier means 150, the sense amplifier means 150 may make the requisite determination as to the address of the word which has been stored the longest, as indicated above in the description of FIG. 1, by merely comparing the magnitudes of the pulses applied thereto and designating the largest such pulse, point A' in FIG. 4, as representative of the word being longest stored while the address thereof may be determined from the position in the sequence which it occupied. Thus the sense amplifier means 150 may comprise conventional apparatus and the address of the word longest stored in the memory array 100 may be applied to the input of the equality circuit means 210 over the conductor 44.

Figure 5:
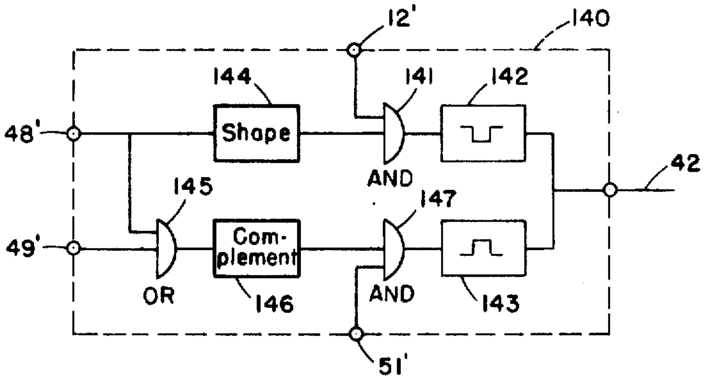
FIG. 5 is a schematic block diagram illustrating an embodiment of first means for indicating the access experience of words stored in the embodiment of the high-speed memory apparatus illustrated in FIG. 2.

The pulse generator means 140 connected to the common conductor 42 and utilized to apply the pulses $P_N$ and $P_A$ thereto may take the form illustrated in FIG. 5. Accordingly, as shown in FIG. 5, the pulse generator means 140 comprises shaping circuit means 144, AND gate means 141 and 147, negative pulse generator means 142, OR gate means 145, complementary logic means 146 and positive pulse generator means 143. The shaping circuit means 144 may be conventional and acts in the well-known manner to impart a desired waveform to input signals applied thereto and to supply the thus-shaped signals to the output terminal means thereof. The shaping circuit means 144 is connected between the input terminal means 48' and a first input to the AND gate means 141. The input terminal means 48' is connected to the conductor 48, as indicated by the primed notation, and thus receives an input signal from the control unit 20 each time a writing operation is initiated. The AND gate means 141 is conventional and acts in the well-known manner to apply and transmit an output signal to the negative pulse generator means 142, connected thereto, when input signals are applied to both of the inputs thereto. The second input of the AND gate means 141 is connected to the input terminal means 12'. The input terminal means 12' is adapted to receive the second timing pulse of the timing pulse generator means 70, as shown in FIGS. 1 and 2, when such second timing pulse is produced on the conductor 12 pursuant to the control of the control unit 20 and the clock pulse generator means 60. The negative pulse generator means 142 is conventional and acts in the well-known manner to produce a negative pulse in response to the output of the AND gate means 141. The output of the negative pulse generator means 142 is connected to the common conductor 42 and hence is applied to each of the monitoring storage elements coupled thereto as shown in FIG. 2. The OR gate means 145 is a conventional device which acts in the usual manner to apply an output signal to the complementary logic means 146 connected thereto when an input signal is present at any of the inputs thereto. A first input of the OR gate means 145 is connected to the input terminal means 48, while a second input thereof is connected to the input terminal means 49'. The input terminal means 49' is connected to the conductor 49, as indicated by the primed notation, and accordingly the input terminal means 49' is adapted to receive an input signal from the control unit 20 whenever a read operation is initiated thereby. The complementary logic circuit means 146 is a conventional device which acts in the well-known manner to exhibit no output signal when an input signal is applied thereto by the OR gate means 145 and produce an output signal which is coupled to a first input of the AND gate means 147 when no input signal is applied thereto by the OR gate means 145. The AND gate means 147 may take the usual form and acts similarly to the AND gate means 141 to apply an output to the positive pulse generator means 143 when signals are present at both the first and second inputs thereto. The second input of the AND gate means 147 is coupled to the input terminal means 51'. The input terminal means 51' is coupled to the conductor 51, as indicated by the primed notation, and is thus adapted to receive an input pulse from the clock pulse generator means 200, illustrated in FIGS. 1 and 2, whenever such clock pulse means 200 is triggered by the control unit 20. The clock pulse means 200 is triggered by the control unit 20 at the termination of an information transfer to the high-speed memory apparatus according to the present invention. The positive pulse generator means 143 is conventional and thus acts in response to the output of the AND gate means 147 to produce a positive output signal which is applied to the common conductor 42 coupling the monitoring storage elements $P_1$—$P_3$.

In the operation of the pulse generator means 140 illustrated in FIG. 5, three distinct cases must be distinguished. In the first such case, a write-in operation is being conducted in the planar storage array 100. Thus, under these conditions, an input signal is coupled to the input terminal means 48' by the control unit 20 over the conductor 48. This input signal, as applied to the input terminal means 48', is coupled to the input of the shaping circuit means 144 where such signals are appropriately shaped and thereafter applied to a first input of the AND gate means 141. Furthermore, as a write-in operation is being conducted, the control unit 20 will trigger the clock pulse generator means 60, which in the manner aforesaid causes the timing pulse generator means 70 to produce a first timing pulse on the conductor 11 and a second timing pulse on the conductor 12. Therefore, when this second timing pulse is applied through the conductor 12 to the input terminal means 12'; the AND gate means 141 will apply a signal to the input of the negative pulse generator means N, In response to the output of the AND gate means 141, the negative pulse generator means 142 will produce a negative pulse and apply the same to the common conductor 42. The pulse produced by the negative pulse generator means 142 and applied to the common conductor 42 is illustrated in FIG. 3B as the pulses $P_N$, $P_N'$ or $P_N''$. These pulses will be in partial time coincidence with word write pulses applied to the word conductor 14A—14C since the second timing pulse applied to the enabling input terminal means 12' of AND gate means 141 is the same timing pulse utilized to time the pulse production of the bit driver means 120. In addition, in the case of the write operation, the signal applied to the input terminal means 48' is coupled to the OR gate means 145 and hence to the complementary logic means 146. Thus, since in response to an input signal, the complementary logic means 146 exhibits no output signal, the positive pulse generator means 143 will not be actuated even if a signal should be applied to the input terminal means 51' of the AND gate means 147. Thus, it is seen that the pulse generator means produces the $P_N$ pulses on the line 42 in a properly timed relationship with the write pulses applied to the write conductors.

In the second case, no write-in or readout operation is being carried out in the planar storage array 100 such that no signals are applied to the input terminal means 48' or 49' by the control unit 20 and the clock pulse generator means 200 was triggered by the control unit 20 at the termination of the last write-in cycle. Therefore, under these conditions, the complementary logic means 146 receives no input signal from the OR gate means 145, as no inputs are applied thereto, and accordingly, the complementary logic means 146 will produce an output signal and apply the same to a first input of the AND gate means 147. The second input of the AND gate means 147 is connected to the input terminal means 51' connected over the conductor means 51 to the output of the clock pulse generator means 200. As the clock pulse generator means 200 has already been triggered by the control unit 20, clock pulses will be periodically received at the second input to the AND gate means 147, which clock pulses may have a repetition rate equal to the repetition rate of the periodic pulses $P_A$ illustrated in FIG. 3B. Accordingly, the AND gate means 147 will be periodically enabled to thereby periodically apply an input signal to the positive pulse generator means 143. The positive pulse generator means 143, in response to the periodically applied input signals received thereby, will periodically produce positive pulses and apply such pulses to the common conductor 42. These pulses will take the form of the pulses $P_A$ illustrated in FIG. 3B. Thus, under these conditions, the pulse generator means 140 will periodically produce the pulses $P_A$ illustrated in FIG. 3B.

Under the last case, the pulse generator circuit 140 may be considered to be producing the periodic pulses $P_A$ and applying such pulses to the common conductor 42, in the manner described above, when a readout operation of any of the words A—C is ordered. Under these conditions, the control unit 20 will apply a pulse through the conductor 49 to the input terminal means 49' in the manner described above. As the input pulse thus applied to the input terminal means 49' is received at the second input of the OR gate means 145, an input signal will be applied to the complementary logic means 146A. In response to the input signal thus applied thereto, the complementary logic means 146 will not exhibit an output signal whereby the AND gate means 147 will be disabled for the duration of this signal which is equal to the time interval in which the read pulse is applied to a word conductor to thereby accomplish the read operation ordered. As the AND gate means 147 is thus disabled, the positive pulse generator means 143 will not produce a pulse $P_A$ during this interval. This operation of the pulse generator means 140 is represented by the dashed pulse position $P_B$ in FIG. 3B and serves to demonstrate that no periodic pulse $P_A$ is produced by the pulse generator means 140 during the time interval indicated by $P_B$. This operation is desirable because if a positive pulse was applied to the common conductor 42 when any of the monitoring storage elements P1—P3 was in receipt of a read signal, which here takes the same waveform as a write signal, such monitoring storage element would be driven into the opposite remanent condition from that which obtains when writing takes place and hence would be useless in its monitoring role as the periodic pulses $P_A$ would no longer have any affect thereon. Accordingly, during a read operation, the periodic pulse production of pulses on column conductor 42 is temporarily suspended so that the monitoring function of the monitoring storage elements $P_1$—$P_3$ may be retained.

Figures 6A, 6B:
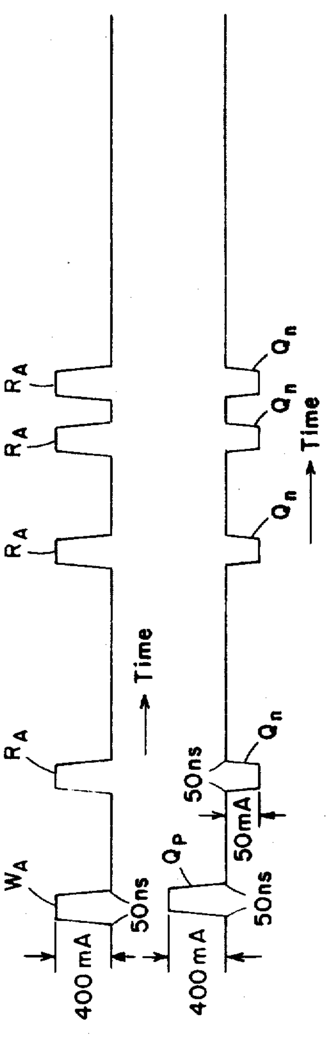
FIGS. 6A and 6B are waveforms representative of the relationship between read pulses applied to read out a word and the pulses applied by a second means for indicating the access experience of words stored in the embodiment of the high-speed memory apparatus according to the present invention, as illustrated in FIG. 2, respectively.

The monitoring function carried out by the monitoring storage elements $Q_1$—$Q_3$, which are each commonly coupled by the conductor 43 to the pulse generator means 160 and the sense amplifier means 170, as stated above, is to monitor how often the words stored in the word addresses A—C have been read out since such words were written into said word addresses A—C. As generally stated above, this function is here carried out by the application to the pulse generator means 160 of timing pulses and control signals which cause said pulse generator means 160 to apply unitary pulses to the monitoring storage elements $Q_1$—$Q_3$ so that said monitoring storage elements $Q_1$—$Q_3$ assume, due to said unitary pulses applied thereto in combination with read pulses, a magnetic condition representative of how often the words associated therewith have been read out. More particularly, the pulse generator means 160 acts to cause the monitoring storage elements $Q_1$—$Q_3$ to assume this representative magnetic condition by the application thereto of unitary pulses each time any word in the array 100 is read out such that said unitary pulses act in combination with the read pulses applied to a given word to discretely change the magnetic condition of the monitoring storage elements $Q_1$—$Q_3$ associated with said given word, in a quantized manner. Thus, the more often a given word in the storage array 100 is read out, the more the magnetic condition of the monitoring storage element $Q_1$—$Q_3$ associated therewith will be changed due to the minor loop operation induced in such monitoring storage elements $Q_1$—$Q_3$ due to the combined effect of the read pulses coincidentally applied with said unitary pulses. The relationship between the pulses applied to a word conductor 14A—14C and the unitary pulses applied to the conductor 43 by the pulse generator means 160 is shown in FIGS. 6A and 6B wherein such pulses applied to a word conductor 14A—14C are indicated in FIG. 6A while the unitary timing pulses are shown in FIG. 6B.

When a word is written into designated word address A—C of the memory storage array 100, a write pulse is applied to the requisite word conductor 14A—14C, respectively, bit pulses are applied to each of the conductors $17_1$—$17_9$ and a negative pulse $P_N$ is applied to the common conductor 42. This operation all takes place under the control of the control unit 20 in the manner described above. In addition, when a word is written into a designated word address A—C of the memory storage array 100, the pulse generator means 160, in a manner described below, applies a positive pulse to the conductor 43 which is thus coupled to all of the monitoring storage elements $Q_1$—$Q_3$ magnetically linked thereto. Thus, if it is assumed that the word address A is being subjected to a write-in operation, the pulse $W_A$, illustrated in FIG. 6A, will be applied to the word conductor 14A. As the monitoring storage element $Q_1$ is located at the intersection of the word conductor 14A and the column conductor 43, the monitoring storage element $Q_1$ receives both of the pulses $W_A$ and $Q_P$ illustrated in FIGS. 6A and 6B, respectively. The monitoring storage elements $Q_2$ and Q 3, however, receive only the pulse $Q_P$ as the word conductor 14A is not coupled thereto. The pulses $W_A$ and $Q_P$ as shown in FIGS. 6A and 6B are coincident in time and thus the storage element $Q_1$, having each of these coincident pulses applied thereto, will, in the well-known manner, be switched to one of its two possible saturated states. Therefore, when the drive pulses $W_A$ and $Q_P$ abate, the monitoring storage element $Q_1$ will remain in the state of remanence related to the state of saturation to which it was driven by the pulses $W_A$ and $Q_P$. Accordingly, at the moment of termination of a write operation in the word address A, the monitoring storage element $Q_1$ will be in one of its remanent states of magnetization which is here considered to be the positive remanent state. If it is further assumed for the purposes of explanation, that several read operations are initiated in the memory storage array 100 for the word address A, the portion 90A of the word driver means 90 will apply to the word conductor 14A, in the manner described above, one interrogate pulse $R_A$, as indicated in FIG. 6A, for each read operation thus initiated. In addition, the pulse generator means 160, in a manner to be explained hereinafter, will apply one unitary pulse $Q_N$, as illustrated in FIG. 6B, for each read operation initiated. The unitary pulses $Q_N$ applied by the pulse generator means 160 during a read operation, as indicated in FIG. 6B, are of opposite polarity to the pulse $Q_N$ applied thereby during a write-in operation and the unitary pulses $Q_N$ are of substantially less magnitude than the pulse $Q_N$. However, as may be seen in FIG. 6B, the unitary pulse $Q_N$ in a similar manner to the pulse $Q_P$ is applied to the common conductor 43 so as to coincide in time in its application to the monitoring storage element $Q_1$ with the pulses applied thereto on the word conductor 14A. Thus, each unitary pulse $Q_N$ illustrated in FIG. 6B is shown in a coincident relationship with the word, read pulses $R_A$ applied to the word conductor 14A. As mentioned above, a unitary pulse $Q_N$ as applied by the pulse generator means 160 during a read operation is oppositely directed and of substantially less magnitude than a pulse $Q_P$ applied to the conductor 43 by the pulse generator means 160 during a write operation. Thus, as is well known, the opposite directivity of the pulses $Q_P$ and $Q_N$ are utilized to drive the monitoring storage element $Q_1$ toward opposite states of saturation; however, while the magnitude of the pulse $Q_P$ is designed to act in combination with the magnitude of the pulse $W_A$ to drive the monitoring storage element $Q_1$ to saturation, the magnitude of the pulse $Q_N$ is calculated to act in combination with the magnitude of the pulse $R_A$ to disturb the monitoring storage element $Q_1$ sufficiently to induce only minor loop operation therein in a similar manner to a quantized pulser. Furthermore, the magnitude of a unitary pulse $Q_N$ is selected in combination with the magnetic characteristics of the monitoring storage elements $Q_1$—$Q_3$ such that in the absence of a coincident read pulse $R_A$, a given unitary pulse $Q_N$ will only cause the monitoring storage element $Q_1$-—$Q_3$ to which it is applied to shuttle whereby the knee of the hysteresis loops thereof are not approached and no minor loop operation will be induced therein. Thus, although the combination of the pulses $W_A$ and $Q_P$ applied during a write-in operation left the monitoring storage element $Q_1$, in the positive remanent state, each combination of pulses $R_A$ and $Q_N$ applied during a readout operation causes a minor loop excursion to take place in the monitoring storage element $Q_1$, so that repeated applications of the pulses $R_A$ and $Q_N$ to the monitoring storage element $Q_1$, which occur with repeated interrogation of the word stored in the A word address, will cause the magnetic condition of the monitoring storage element $Q_1$ to change from the negative remanent state toward the positive remanent state in a series of discrete or quantized steps. Furthermore, the monitoring storage elements $Q_2$ and $Q_3$, which receive only a unitary column pulse $Q_N$ during the readout operation of the word A, will not have their magnetic conditions changed from that initially present prior to the interrogation of the word A. Thus it will be seen that when a given word is written into a given word address, the monitoring storage elements $Q_1$—$Q_3$ associated therewith will assume a first remanent magnetic condition, and thereafter with subsequent nondestructive read operations of the given word stored, the magnetic condition of the monitoring storage elements $Q_1$—$Q_3$ associated therewith will be discretely changed in a stepwise manner toward the opposite remanent magnetic state to thereby reflect the number of times which read out of the given word stored has occurred. In addition, no magnetic changes are induced by the operation of the pulse generator means 160 in the monitoring storage elements $Q_1$—$Q_3$, not associated with the given word read out. Accordingly, it will be seen, that after a number of read operations have taken place for the words stored in the word addresses A—C, the monitoring storage elements $Q_1$—$Q_3$ associated with the word most often read will exhibit a magnetic condition on its hysteresis loop furthest removed from the initial, negative remanent condition established when such word as initially written into its respective word address, while the monitoring storage elements $Q_1$—Q 3 associated with words read out a lesser number of times will exhibit a magnetic condition which is removed from the initial, negative write condition to a lesser degree. Thus if the monitoring storage elements $Q_1$—$Q_3$ are nondestructively read out by the sequential energization of the portions 90A—90C of the word driver means 90, which act under the control of the control unit 20 in the manner aforesaid, the largest readout pulse produced by one of the monitoring storage elements $Q_1$—$Q_3$ will be indicative of the word address having a word stored therein which has been most often read out and the smallest readout pulse produced by one of the monitoring storage elements $Q_1$—$Q_3$ will be indicative of a word address having a word stored therein which has been read out the least number of times, hence having the lowest rate of readout recurrence.

FIG. 7 is a graphical representation of the magnitude of a pulse read out from a monitoring storage element such as one of the monitoring storage elements $Q_1$—$Q_3$ plotted as a function of the number of unitary pulses $Q_N$ in combination with read pulses $R_A$ applied thereto. In FIG. 7, the magnitude of a readout pulse is plotted along the ordinate in millivolts while the number of coincident applications of unitary pulses $Q_N$ and read pulses R received is indicated along the abscissa. In FIG. 7, the point N illustrated is representative of the condition of a monitoring storage element $Q_1$—$Q_3$ just after a write operation has been completed in the word address associated therewith and prior to any readout of such word address. The points A'', B'' and C'' indicate the condition of the monitoring storage elements $Q_1$, $Q_2$ and $Q_3$, respectively, where the words stored in the word addresses A—C have been read out a substantial number of times and have a word readout recurrence rate such that the word stored in the C word address has been read the greatest number of times, the word stored in the A word address has been read the least number of times and the word stored in the B word address has been read out an intermediate number of times.

As was described above, when the address of the word stored in the planar memory array 100 having the least access experience is sought, interrogation pulses are sequentially applied to each of the word conductors 14A—14C present in the memory array 100. This operation is so far as the monitoring storage elements $Q_1$—$Q_3$ are concerned results in the sequential application to the conductor 43 of three pulses read out from the storage elements $Q_1$—$Q_3$. When these pulses are applied to the sense amplifier means 170, the sense amplifier means 170 may make the requisite determination as to the address of the stored word which has been read out the least number of times, in the manner indicated above, by merely comparing the magnitudes of the pulses applied thereto and designating the pulse indicated by point A fin FIG. 7 as representative of the word which has been read out the least number of times while the address thereof may be determined by the position in the sequence which is occupied. Thus the sense amplifier means 190 may comprise conventional apparatus and the address of the word read out the least number of times in the memory array 100 may be applied to the input of the equality circuit means 210 over the conductor 46.

The pulse generator means 160 connected to the common conductor 43 and utilized to apply the pulses $Q_P$ and $Q_N$ thereto may take the form illustrated in FIG. 8. Thus, as shown in FIG. 8, the pulse generator means 160 comprises shaping circuit means 164 and 166, AND gate means 163 and 165, positive pulse-generating means 161 and the negative pulse-generating means 162. The shaping circuit means 164 and 166 are conventional devices which act in the well-known manner to impart a desired waveform to an input signal applied thereto. The shaping circuit means 164 is connected between the input terminal means 53' and a first input of the AND gate means 163. The input terminal means 53', as indicated by the primed notation, is connected to the conductor 53 and is therefore adapted to receive an input signal from the control unit 20 whenever a write operation in the memory storage array 100 is initiated. The input signal applied to the input terminal means 53' is thus appropriately shaped by the shaping circuit means 164 and applied to a first input of the AND gate means 163. The AND gate means 163 may be conventional and acts in the well-known manner to provide an output signal at the output thereof when each of the first and second inputs thereto are in receipt of appropriate signals. The second input of the AND gate means 163 is coupled to input terminal means 12'. The input terminal means 12', as indicated by the primed notation, is connected to the conductor 12 and thus, the input terminal means 12' is adapted to receive the second timing pulse of the timing pulse generator means 70, illustrated in FIGS. 1 and 2, when the same is produced on the conductor 12 pursuant to the control of the control unit 20 and the clock pulse generator means 60. The output of the AND gate means 163 is connected to the input of the positive pulse generator means 161. The positive pulse generator means 161 may comprise a conventional device which in the well-known manner produces a positive pulse in response to an input signal applied thereto. The output of the positive pulse generator means 161 is connected to the common column conductor 43 whereby, when said positive pulse generator means 161 is energized, the pulse $Q_P$, as illustrated in FIG. 6B, is applied to the common conductor 43. The shaping circuit means 166 may be similar in form and function to the previously described shaping circuit means 164. The input to the shaping circuit means 166 is connected to input terminal means 54' while the output thereof is connected to a first input of the AND gate means 165. The input terminal means 54', as indicated by the primed notation, is connected to the conductor 54 and is therefore adapted to receive an input signal from the control unit 20 whenever a read operation is initiated. This input signal as applied to the input terminal means 54', in the well-known manner, is appropriately shaped by the shaping circuit means 166 and coupled to a first input of the AND gate means 165. The AND gate means 165 may be similar to AND gate means 163, described above, and as illustrated in FIG. 8 is connected at a second input thereof to the input terminal means 12'. The output of the AND gate means 165 is applied to the input of the negative pulse generator means 162. The negative pulse generator means 162 is a conventional device which acts in the well-known manner to produce a negative pulse, having a predetermined magnitude, in response to an input signal applied thereto. The output of the negative pulse generator means 162 is connected to the common column conductor 43 and is thus adapted to produce the unitary pulse $Q_N$, illustrated in FIG. 6B.

In the operation of the pulse generator means 160 illustrated in FIG. 8, two distinct cases of operation must be noted. The first such case is where the write operation is being initiated in one of the word addresses A—C of the memory storage array 100. Under these conditions, the control unit 20 produces a signal on the conductor 53 which is coupled to the input terminal means 53' and hence to the input of the shaping circuit means 164. This input signal is shaped by said shaping circuit means 164 and thereafter applied to the first input of the AND gate means 163. The AND gate means 163 is thus enabled and therefore, when the timing pulse generator means 70 produces the second timing pulse on conductor 12, connected to the input terminal means 12', the AND gate means 163 in response thereto applies a pulse to the input of the positive pulse generator means 161. In response to the output of the AND gate 163, the positive pulse generator means 163 will produce the pulse $Q_P$, illustrated in FIG. 6B, and apply such pulse $Q_P$ to the common column conductor 43. The pulse $Q_P$ thus applied to the common column conductor 43 will be properly timed to coincide in time with the word write pulse applied to the word conductor 14A—14C of the word address in which the transfer is taking place because the second timing pulse applied to the input terminal means 12' to open AND gate means 163 is the same second timing pulse relied upon to time the bit driver means 120. Furthermore, under these conditions, the AND gate means 166 will produce no output in response to the second timing pulse applied to the input terminal means 12' because the first input thereof has not been otherwise enabled. Thus it will be seen that when a write operation is initiated in any of the words A—C of the memory storage array 100, a positive pulse $Q_P$ is produced on the common column conductor 43 by the pulse generator means 160.

In the second distinct case under which the operation of the pulse generator means 160 must be considered, a readout operation is initiated in one of the word addresses A—C of the planar memory storage array 100. Accordingly, when a readout operation is initiated in one of the word addresses A-—C of the planar memory storage array 100, the control unit 20 will apply an input signal to the conductor 54. This input signal is coupled to the input terminal means 54' and is thereby applied to the input of the shaping circuit means 166. The input signal applied to the input terminal means 54' is thus appropriately shaped and thereafter applied to a first input of the AND gate means 165. When the timing pulse generator means 70 produces a second timing pulse, due to the output of the clock generator means 60 applied thereto, this second timing pulse will be applied to the input terminal means 12' connected to the second input of the AND gate means 165 and the conductor 12. The second timing pulse applied to the input terminal means 12' thereby causes the enabled AND gate means 165 to pulse the input of negative pulse generator means 162. The negative pulse generator means 162 in response to the output of the AND gate means 165 produces the negative pulse $Q_N$, shown in FIG. 6B, and applies the same to the common column conductor 43. The pulse $Q_N$ thus applied to the common column conductor 43 will be properly timed for coincidence at one of the monitoring storage element $Q_1$—$Q_3$ with the word read pulse applied thereto, since the AND gate 165, like its corresponding counterpart AND gate 163, is timed by the second timing pulse produced by the timing pulse generator means 70. The AND gate means 163, however, is not under these conditions enabled because no first input signal is applied thereto. Therefore, when a read operation is initiated for any of the words A—C of the memory storage array 100, a negative pulse $Q_N$ is produced on the common column conductor 43 by the pulse generator means 160.

Returning now to FIG. 2, it will be seen that the monitoring storage elements $P_1$—$P_3$ exhibit a magnetic condition representative of how long the words stored in the word addresses associated therewith have been present therein while the monitoring storage elements $Q_1$—$Q_3$ exhibit a magnetic condition indicative of the relative number of times the words associated therewith have been read out. Accordingly, when the control unit 20 is supplied with instructional signals requesting that the address of the word having the least access experience be determined, the control unit 20 will, as mentioned above, cause the portions 90A—90C of the word driver means 90 to sequentially apply read pulses to the word conductors 14A—14C, respectively. In response to the read pulses applied thereto, the monitoring storage elements $P_1$ $Q_1$, $P_2$ $Q_2$ and $P_3$ $Q_3$ will be sequentially and nondestructively read out. The pulses read out sequentially from the monitoring storage elements $P_1$—$P_3$ will be coupled by the common conductor 42 to the sense amplifier means 150, while the pulses read out sequentially from the monitoring storage elements $Q_1$— $Q_3$ will be coupled by the conductor 43 to the sense amplifier means 170. The sense amplifier means 150, acting in the manner mentioned above, amplifies and compares the readout pulses of the monitoring storage elements $P_1$—$P_3$ sequentially applied thereto and supplies the address of the word $A_C$ containing word information which has been stored the longest therein, as indicated by the relative magnitudes of the readout pulses, to a first input of the equality circuit means 210 via the conductor 44. Similarly, the sense amplifier means 170, acting in the manner indicated above, amplifies and compares the readout pulses of the monitoring storage elements $Q_1$—$Q_3$ sequentially applied thereto and supplies the address of the Word A—C having word information stored therein which has been read out the least number of times, as also indicated by the relative magnitudes of the readout pulses, to a second input of the equality circuit means 210 via the conductor 46. The equality circuit means 210 is responsive, in the manner indicated above, to the first and second word address inputs applied thereto to compare such inputs, and if the word addresses represented therein are the same, to apply a signal representative of such word addresses to the control unit 20 through the conductor 47. Thus, as the input signal applied to the conductor 44 is representative of the word which has been stored the longest in the planar memory array 100 while the input signal applied to the conductor 46 is representative of the word address A—C having word information therein which has been read out the least number of times, the output of the equality circuit means 210, when produced in response to the same inputs on conductors 44 and 46, represents the address of a word in the planar memory array 100 which has been stored therein for the longest period of time and which has been read out the least number of times. The control unit 20 is supplied through the conductor 47 with the output signal of the equality circuit means 210 and thus, the address of the word stored in the planar memory array 100 having the least access experience, as measured both as to duration within the word storage location and as to the number of times readout has occurred, may be supplied to the console by the control unit 20. In response to the indication of the word address in the high-speed memory apparatus 50 which exhibits the least experience of access, the control unit 20 would then, in the usual course of events, receive instructional signals to transfer the word then stored in the indicated word address and substitute new word information therefor. Thus it will be manifest that the high-speed memory apparatus according to the present invention allows the maximum use of each of the word storage locations therein because the access experience of each of said word storage locations is monitored on a continuing basis so that the address of the word storage location having the least access experience is readily available in order that word information having a greater degree of present utility may be substituted therefor.

Although the high-speed storage apparatus according to the present invention has been described in conjunction with an exemplary embodiment thereof, many alterations and modifications thereof are available, as will be obvious to those of ordinary skill in the art, to meet the requirements of the overall system in which such high-speed storage apparatus is to be used or to meet desired design criteria. Thus, it will be apparent that a large three-dimensional matrix or group thereof may be substituted for the thin film planar array utilized in the exemplary embodiment and that any form of bistable storage elements may be used therein.

Furthermore, although the exemplary embodiment of the high-speed memory apparatus according to the present invention relied upon two forms of monitoring to determine access experience, it will be obvious that where desired or necessary either one of the illustrated forms of monitoring access experience, as disclosed herein, may be relied upon and that a substantial reduction in the apparatus utilized will result therefrom. Thus, if it is considered desirable to measure access experience solely on the basis of the length of time during which a given word has been stored in a word address, the monitoring storage elements $Q_1$—$Q_3$, the pulse generator means 160, the sense amplifier means 170 and the equality circuit means 210 may be deleted whereby the output of the sense amplifier means 150 would be connected to the control unit 20 via conductor 47. Conversely, if it was considered desirable to measure access experience solely on the basis of how often a given word in a word address has been read out, the monitoring storage elements $P_1$—$P_3$, the pulse generator means 140, the sense amplifier means 150, the equality circuit means 210 and the clock pulse generator means 200 may be deleted whereby the output of the sense amplifier means 170 would be connected to the control unit 20 through the conductor 47. In addition, although the sense amplifier means 150 and 170 were described herein as adapted to detect the longest word duration and the least readout recurrence, respectively, it will be apparent that should it be considered advantageous to detect the address of a word manifesting the shortest storage duration and/or the greatest readout recurrence, the monitoring apparatus described herein will also serve these purpose if additional sense amplifier means are provided to seek out readout pulse magnitudes representative of this information.

Additionally, although the conventional form of address selection memory has been utilized to illustrate an exemplary embodiment of the present invention, it should be apparent that other forms of address selection memories may be utilized herein. For instance, an associative memory which is accessible on the basis of the matching of the contents of the stored information therein may alternatively be employed in the high-speed memory apparatus according to the present invention. Thus, if such an associative memory is utilized, the word address need not be indicated to the control unit each time new information is written. Furthermore, information may be written, with tags, into an unoccupied word address or into word addresses whose stored information exhibits low access experience. Furthermore, by using associative memory techniques, the contents of the monitoring storage elements may be read out and compared directly rather than requiring each word conductor to be pulsed as in the exemplary embodiment, described above, of the high-speed memory apparatus according to the present invention.

Therefore, as it is apparent that many modifications and variations of the concepts of the present invention will be obvious to those of ordinary skill in the art, this invention should be interpreted as limited only by the claims and the equivalents thereof.

I claim:

1. In a data processing system including high-speed memory apparatus, low-speed memory apparatus and means adapted to transfer designated information at least therebetween, the improvement in said high-speed memory apparatus comprising:

at least one memory storage array including a plurality of column conductors and a plurality of row conductors intersecting said plurality of column conductors, said at least one memory storage array further including a plurality of first magnetic storage elements disposed at certain of the intersections of said plurality of column and row conductors in a manner such that at least one of said plurality of first magnetic storage elements is disposed at each of said certain of said intersections and a plurality of second magnetic storage elements disposed at other intersections of said plurality of column and row conductors in a manner such that at least one of said plurality of second magnetic storage elements is disposed at each of said other intersections, said plurality of second magnetic storage elements being arranged in said storage array so that each of said plurality of second magnetic storage elements is associated with selected ones of said plurality of first magnetic storage elements;

means for writing information into said plurality of first magnetic storage elements, said writing means being operatively connected to each of the row and column conductors having intersections associated with said first magnetic storage elements;

means adapted to apply readout pulses to said plurality of first and second magnetic storage elements, said means adapted to apply readout pulses to said plurality of first and second magnetic storage elements being operatively connected to first conductors of said plurality of row and column conductors having intersections associated with said first and second magnetic storage elements;

pulse generator means adapted to apply monitoring pulses to said plurality of second magnetic storage elements, said pulse generator means being operatively connected to second conductors of said plurality of row and column conductors having intersections associate with said second magnetic storage elements, said monitoring pulses being adapted to render the magnetic state of said second magnetic storage elements representative of the access experience of said selected ones of said plurality of first magnetic storage elements associated therewith; and means for sensing the magnetic condition of each of said plurality of second magnetic storage elements upon the application of a readout pulse thereto, whereby the access experience of each group of said selected ones of said first magnetic storage elements is available.

2. The improved high-speed memory apparatus according to claim 1 wherein one of said first and second conductors of said plurality of row and column conductors includes only row conductors and the other of said first and second conductors of said plurality of row and column conductors includes only column conductors.

3. The improved high-speed memory apparatus according to claim 2 wherein said pulse generator means includes means for applying counterpulses having a high repetition frequency to particular ones of said plurality of second magnetic storage elements, said means for applying counterpulses being operative to apply counterpulses whose magnitude is insufficient to change the magnetic condition of a second magnetic storage element from a first magnetic state to a second magnetic state in response to only a single such counterpulse but whose magnitude is sufficient to gradually change the magnetic condition of a second magnetic storage element from a first magnetic state to a second magnetic state in a stepwise manner upon the sequential application of a plurality of such counterpulses thereto.

4. The improved high-speed memory apparatus according to claim 3 wherein said pulse generator means includes means for switching the magnetic condition of each of said particular ones of said plurality of second magnetic storage elements to said first magnetic state when information is written into said selected ones of said plurality of first magnetic storage elements associated therewith.

5. The improved high-speed memory apparatus according to claim 4 wherein said pulse generator means includes means for applying a unit pulse to all of the others of said plurality of second magnetic storage elements whenever readout pulses are applied to any of said plurality of first or second magnetic storage elements, said unit pulse being of insufficient magnitude to change the magnetic condition of a second magnetic storage element in the absence of a readout pulse coincidentally applied therewith, said unit pulse being of insufficient magnitude to change the magnetic condition of a second magnetic storage element from said second magnetic state to said first magnetic state in the presence of a readout pulse coincidentally applied therewith, and said unit pulse being of sufficient magnitude in the presence of a readout pulse applied therewith to gradually change the magnetic condition of a second magnetic storage element from said second magnetic state to said first magnetic state in a stepwise manner upon the sequential application of a plurality of such unit pulses in combination with readout pulses, whereby said others of said second magnetic storage elements serve to monitor how often presently stored information in said selected ones of said plurality of first magnetic storage elements associated therewith have been read out.

6. The improved high-speed memory apparatus according to claim 5 wherein said pulse generator means includes means for switching the magnetic condition of each of said others of said plurality of second magnetic storage elements to said second magnetic state when information is written into said selected ones of said plurality of first magnetic storage elements associated therewith.

7. The improved high-speed memory apparatus according to claim 2 wherein said pulse generator means includes means for applying a unit pulse to certain ones of said plurality of second magnetic storage elements whenever readout pulses are applied to any one of said plurality of first or second magnetic storage elements, said unit pulses being of insufficient magnitude to change the magnetic condition of a second magnetic storage element in the absence of a readout pulse coincidentally applied therewith, said unit pulse being of insufficient magnitude to change the magnetic condition of a second magnetic storage element from a second magnetic state to a first magnetic state in the presence of a readout pulse coincidentally applied therewith, said unit pulse being of sufficient magnitude in the presence of a readout pulse applied therewith to gradually change the magnetic condition of a second magnetic storage element from said second magnetic state to said first magnetic state in a stepwise manner upon the sequential application of a plurality of such unit pulses in combination with readout pulses, whereby said certain ones of said plurality of second magnetic storage elements serve to monitor how often presently stored information in said selected ones of said plurality of first magnetic storage elements associated therewith have been read out.

8. The improved high-speed memory apparatus according to claim 7 wherein said pulse generator means includes means for switching the magnetic condition of each of said certain ones of said plurality of second magnetic storage elements to said second magnetic state when information is written into the said selected ones of said plurality of first magnetic storage elements associated therewith.

9. In a data processing system including high-speed memory apparatus, low-speed memory apparatus and means adapted to transfer designated information at least therebetween, the improvement in said high-speed memory apparatus comprising:

at least one memory storage array including a plurality of bit conductors, at least one monitoring conductor arranged in parallel with said plurality of bit conductors and a plurality of word conductors intersecting said plurality of bit and monitoring conductors, said at least one memory storage array further including a plurality of first magnetic storage elements disposed at the intersections of said plurality of bit and word conductors in a manner such that at least one of said plurality of first magnetic storage elements is disposed at each intersection thereof and a plurality of second magnetic storage elements disposed at the intersections of said at least one monitoring conductor and said plurality of word conductors in a manner such that at least one of said plurality of second magnetic storage elements is disposed at each intersection thereof;

bit driver means for writing information to be stored in said first magnetic storage elements connected to each of said bit conductors;

word driver means for reading out and writing information into said first magnetic storage elements connected to each of said word conductors;

pulse generator means adapted to apply monitoring pulses to said plurality of second magnetic storage elements, said pulse generator means being connected to said at least one monitoring conductor means, said monitoring pulses being adapted to render the magnetic state of a second magnetic storage element coupled by a given word conductor representative of the access experience of said first magnetic storage elements coupled by said given word conductors; and means for sensing the magnetic condition of each of said second magnetic storage elements linked by said monitoring conductor, whereby the access experience of each of the first magnetic storage elements coupled by a common word conductor is available.

10. The improved high-speed memory apparatus according to claim 6 wherein said means for sensing the magnetic condition of each of said plurality of second magnetic storage elements includes first sensing means for sensing the magnetic condition of each of said particular ones of said plurality of second magnetic storage elements supplied with a plurality of counterpulses and second sensing means for sensing the magnetic condition of each of said others of said plurality of second magnetic storage elements supplied with a plurality of unit pulses.

11. The improved high-speed memory apparatus according to claim 10 further comprising means for comparing the magnetic condition of a selected one of said particular ones of said plurality of second magnetic storage elements having a plurality of counterpulses applied thereto with the magnetic condition of a correspondingly selected one of said others of said second magnetic storage elements adapted to have said unit pulses applied thereto, whereby the access experience of information stored in associated ones of said plurality of first magnetic storage elements is monitored.

12. The improved high-speed memory apparatus according to claim 11 wherein each of said particular ones of said plurality of second magnetic storage elements are disposed along a common one of said second conductors of said plurality of row and column conductors and each of said others of said second magnetic storage elements are disposed along another one of said second conductors of said plurality of row and column conductors.

13. The improved high-speed memory apparatus according to claim 9 wherein said pulse generator means includes means for applying counterpulses having a high repetition frequency to said at least one monitoring conductor, said means for applying counterpulses being operative to apply counterpulses whose magnitude is insufficient to change the magnetic condition of a second magnetic storage element from a first magnetic state to a second magnetic state in response to only a single such counterpulse but whose magnitude is sufficient to gradually change the magnetic condition of a second magnetic storage element from a first magnetic state to a second magnetic state in a stepwise manner upon the sequential application of a plurality of such counterpulses thereto.

14. The improved high-speed memory apparatus according to claim 13 wherein said pulse generator means includes means for switching the magnetic condition of a second magnetic storage element disposed at an intersection of said at least one monitoring conductor and a given one of said plurality of word conductors to said first magnetic state whenever said word driver means acts to write information into said first magnetic storage elements disposed at the intersections of said plurality of bit conductors and said given one of said plurality of word conductors.

15. The improved high-speed memory apparatus according to claim 9 wherein said pulse generator means includes means for applying a unit pulse to said at least one monitoring conductor whenever readout pulses are applied to any one of said plurality of word conductors by said word driver means, said unit pulses being of insufficient magnitude to change the magnetic condition of a second magnetic storage element in the absence of a readout pulse coincidentally applied therewith, said unit pulse being of insufficient magnitude to change the magnetic condition of a second magnetic storage element from a second magnetic state to a first magnetic state in the presence of a readout pulse coincidentally applied therewith and said unit pulse being of sufficient magnitude in the presence of a readout pulse applied therewith to gradually change the magnetic condition of a second magnetic storage element from said second magnetic state to said first magnetic state in a stepwise manner upon the sequential application of a plurality of such unit pulses in combination with readout pulses, whereby said plurality of second magnetic storage elements serve to monitor how often presently stored information in said selected ones of said plurality of first magnetic storage elements associated therewith have been read out.

16. The improved high-speed memory apparatus according to claim 15 wherein said pulse generator means includes means for switching the magnetic condition of a second magnetic storage element disposed at an intersection of said at least one monitoring conductor and a given one of said plurality of word conductors to said second magnetic state whenever said word driver means acts to write information into said first magnetic storage elements disposed at the intersections of said plurality of bit conductors and said given one of said plurality of word conductors.

17. The improved high-speed memory apparatus according to claim 13 additionally comprising:

at least a second monitoring conductor arranged in parallel with said plurality of bit conductors and intersecting each of said plurality of word conductors;

a plurality of third magnetic storage elements, one of said third magnetic storage elements being disposed at each intersection of said second monitoring conductor and said plurality of word conductors;

pulse-generating means for applying a unit pulse to said second monitoring conductor whenever readout pulses are applied to any of said plurality of word conductors by said word driver means, said unit pulse being of insufficient magnitude to change the magnetic condition of a third magnetic storage element in the absence of a readout pulse coincidentally applied therewith, said unit pulse being of insufficient magnitude to change the magnetic condition of a third magnetic storage element from a second magnetic state to a first magnetic state in the presence of a readout pulse coincidentally applied therewith, and said unit pulse being of sufficient magnitude in the presence of a readout pulse applied therewith to gradually change the magnetic condition of a third magnetic storage element from said second magnetic state to said first magnetic state in a stepwise manner upon the sequential application of a plurality of such unit pulses in combination with readout pulses, whereby said third magnetic storage elements serve to monitor how often presently stored information in said plurality of first magnetic storage elements associated therewith have been read out; and means for sensing the magnetic condition of each of said third magnetic storage elements linked by said second monitoring conductor.

18. The improved high-speed memory apparatus according to claim 17 additionally comprising means for comparing the magnetic condition of selected ones of said second and third magnetic storage elements, said means for comparing being operatively connected to both said means for sensing the magnetic condition of each of said second magnetic storage elements and said means for sensing the magnetic condition of each of said third magnetic storage elements.